(12) United States Patent
Kirigane

(10) Patent No.: US 12,743,015 B2
(45) Date of Patent: Sep. 22, 2026

(54) IMAGE CAPTURING DEVICE AND PANORAMIC IMAGE CREATION METHOD

(71) Applicant: PFU Limited, Ishikawa (JP)

(72) Inventor: Tomoyuki Kirigane, Kanagawa (JP)

(73) Assignee: PFU Limited, Ishikawa (JP)

( * ) Notice: Subject to any disclaimer, the term of this patent is extended or adjusted under 35 U.S.C. 154(b) by 8 days.

(21) Appl. No.: 18/938,840

(22) Filed: Nov. 6, 2024

(65) Prior Publication Data

US 2025/0159322 A1 May 15, 2025

(30) Foreign Application Priority Data

Nov. 13, 2023 (JP) ................................ 2023-193162

(51) Int. Cl.
*G03B 37/04* (2021.01)
*G03B 11/04* (2021.01)
*H04N 23/55* (2023.01)
*H04N 23/698* (2023.01)

(52) U.S. Cl.
CPC .............. *G03B 37/04* (2013.01); *G03B 11/04* (2013.01); *G03B 11/045* (2013.01); *H04N 23/55* (2023.01); *H04N 23/698* (2023.01)

(58) Field of Classification Search
CPC ...... H04N 23/55; H04N 23/698; G03B 11/04; G03B 11/045; G03B 37/04
See application file for complete search history.

(56) References Cited

U.S. PATENT DOCUMENTS

| | | | | |
|---|---|---|---|---|
| 8,885,016 | B2 * | 11/2014 | Sasagawa .............. | G03B 17/55 348/E5.026 |
| 8,934,019 | B2 | 1/2015 | Sasagawa et al. | |
| 9,544,476 | B2 | 1/2017 | Ishida et al. | |
| 10,728,503 | B1 * | 7/2020 | Fu .......................... | H04N 7/185 |
| 11,520,125 | B2 * | 12/2022 | Kozaki .................. | G02B 27/64 |

(Continued)

FOREIGN PATENT DOCUMENTS

| | | |
|---|---|---|
| CN | 109922276 | 6/2019 |
| CN | 217935777 U | 11/2022 |

(Continued)

OTHER PUBLICATIONS

Kandao: "Introducing Kandao Meeting 360°All-in-one conference camera", Aug. 22, 2019 (Aug. 22, 2019), XP093263646, Retrieved from the Internet: URL:https://www.youtube.com/watch?v=L-jWnnRDU8Q.

(Continued)

*Primary Examiner* — Lin Ye
*Assistant Examiner* — Chriss S Yoder, III
(74) *Attorney, Agent, or Firm* — IPUSA, PLLC

(57) ABSTRACT

An image capturing device for capturing an image at an angle of view of approximately 360 degrees in a horizontal direction, includes: a plurality of lenses having an optical axis in the horizontal direction; and an upper hood to shield incidence of light on the plurality of lenses from directly above. The upper hood limits an incident angle of light to an angle greater than or equal to approximately 30 degrees and less than or equal to approximately 67 degrees, the incident angle being defined by a direction in which light from above is incident on each of the plurality of lenses at a maximum angle and the optical axis of the plurality of lenses.

12 Claims, 33 Drawing Sheets

(56) References Cited

U.S. PATENT DOCUMENTS

| | | | |
|---|---|---|---|
| 2014/0078247 A1 | 3/2014 | Shohara et al. | |
| 2021/0287337 A1* | 9/2021 | Newman | G06T 3/047 |
| 2022/0078328 A1 | 3/2022 | Kazama | |
| 2023/0057103 A1* | 2/2023 | Chakravarty | G08B 13/19628 |

FOREIGN PATENT DOCUMENTS

| | | | | |
|---|---|---|---|---|
| JP | 2003-131293 A | | 5/2003 | |
| JP | 2014-078926 A | | 5/2014 | |
| JP | 2017-050857 A | | 3/2017 | |
| JP | 2017-143390 A | | 8/2017 | |
| JP | 2017-212698 A | | 11/2017 | |
| JP | 2020-123837 A | | 8/2020 | |
| JP | 2020-152180 A | | 9/2020 | |
| JP | 2021-090175 A | | 6/2021 | |
| WO | WO-2020207416 A1 | * | 10/2020 | H04N 23/90 |

OTHER PUBLICATIONS

Extended European Search Report for 24210521.1 mailed on Apr. 9, 2025.

* cited by examiner

Figure 3:
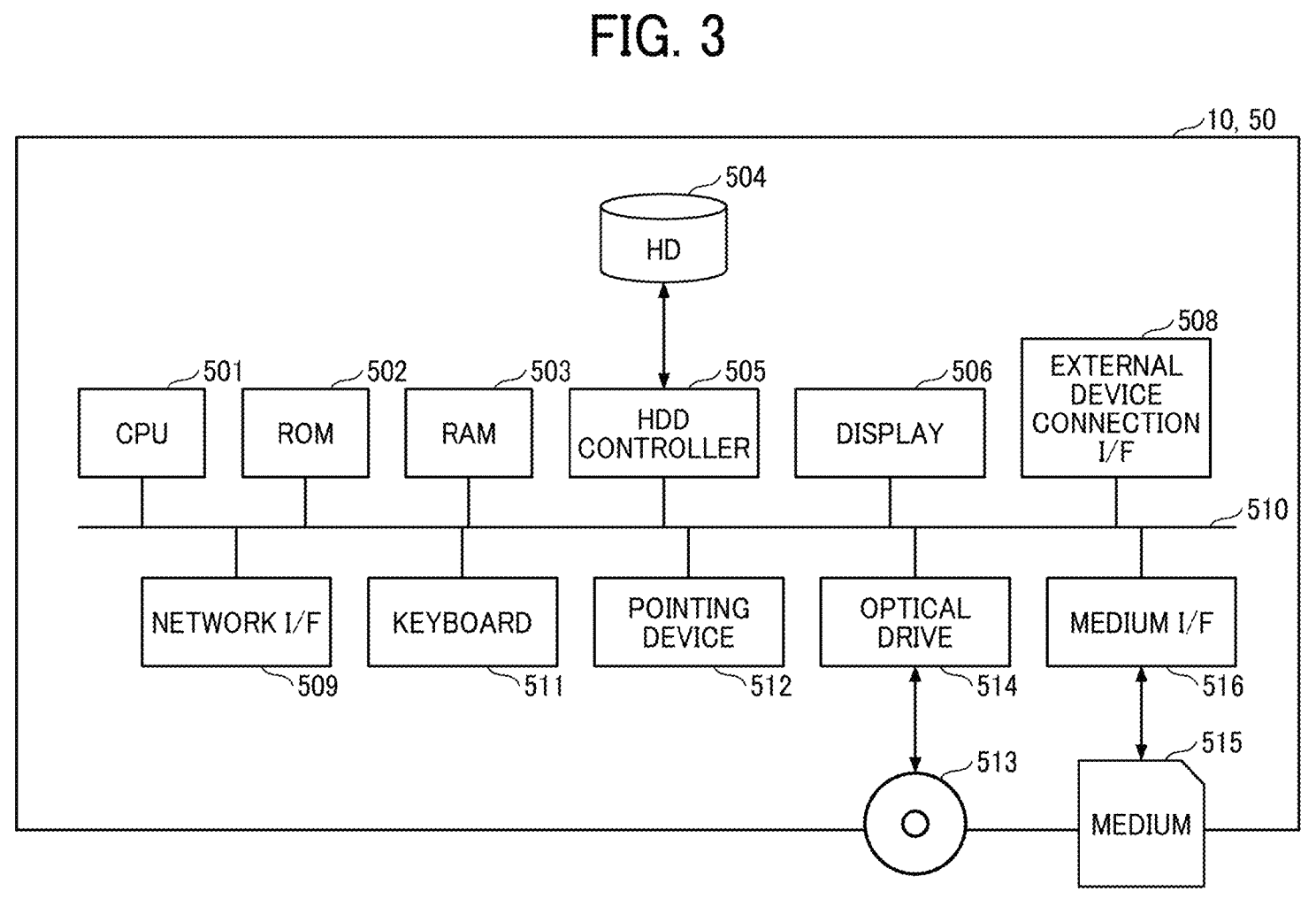

10, 50
510
508 EXTERNAL DEVICE CONNECTION I/F
506 DISPLAY
505 HDD CONTROLLER
504 HD
503 RAM
502 ROM
501 CPU
516 MEDIUM I/F
515 MEDIUM
514 OPTICAL DRIVE
513
512 POINTING DEVICE
511 KEYBOARD
509 NETWORK I/F

FIG. 4

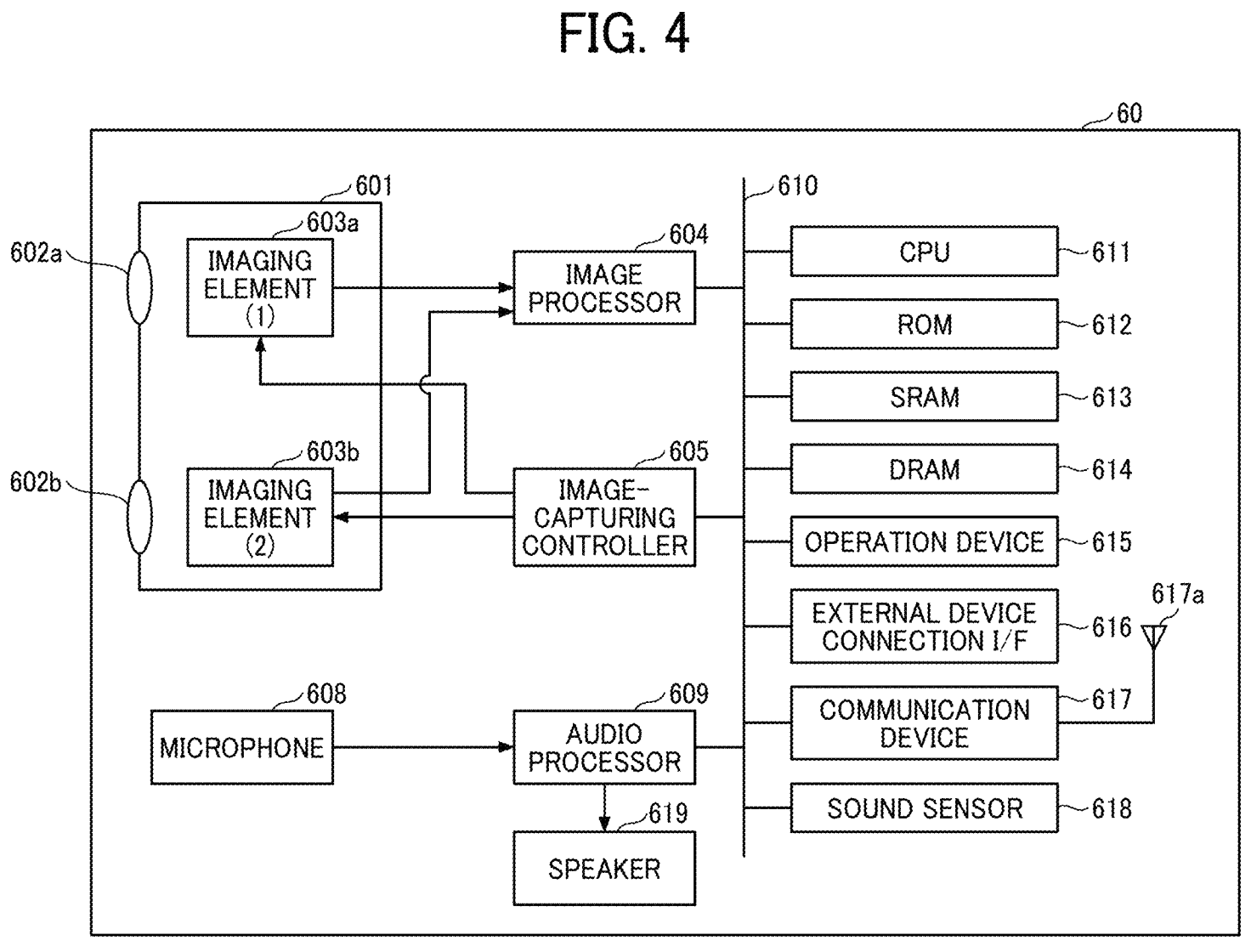

60
601
602a
602b
603a IMAGING ELEMENT (1)
603b IMAGING ELEMENT (2)
604 IMAGE PROCESSOR
605 IMAGE-CAPTURING CONTROLLER
608 MICROPHONE
609 AUDIO PROCESSOR
610
611 CPU
612 ROM
613 SRAM
614 DRAM
615 OPERATION DEVICE
616 EXTERNAL DEVICE CONNECTION I/F
617 COMMUNICATION DEVICE
617a
618 SOUND SENSOR
619 SPEAKER

FIG. 5A

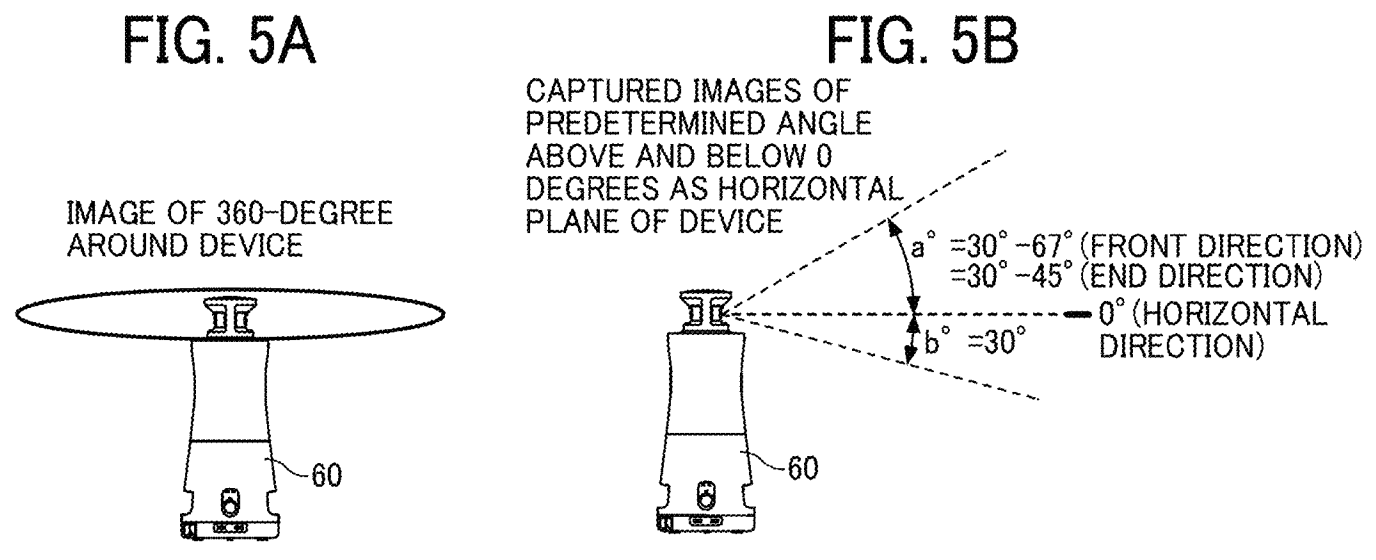

IMAGE OF 360-DEGREE AROUND DEVICE

CAPTURED IMAGES OF PREDETERMINED ANGLE ABOVE AND BELOW 0 DEGREES AS HORIZONTAL PLANE OF DEVICE a° =30°-67° (FRONT DIRECTION)
=30°-45° (END DIRECTION)

b° =30°

0° (HORIZONTAL DIRECTION)

60

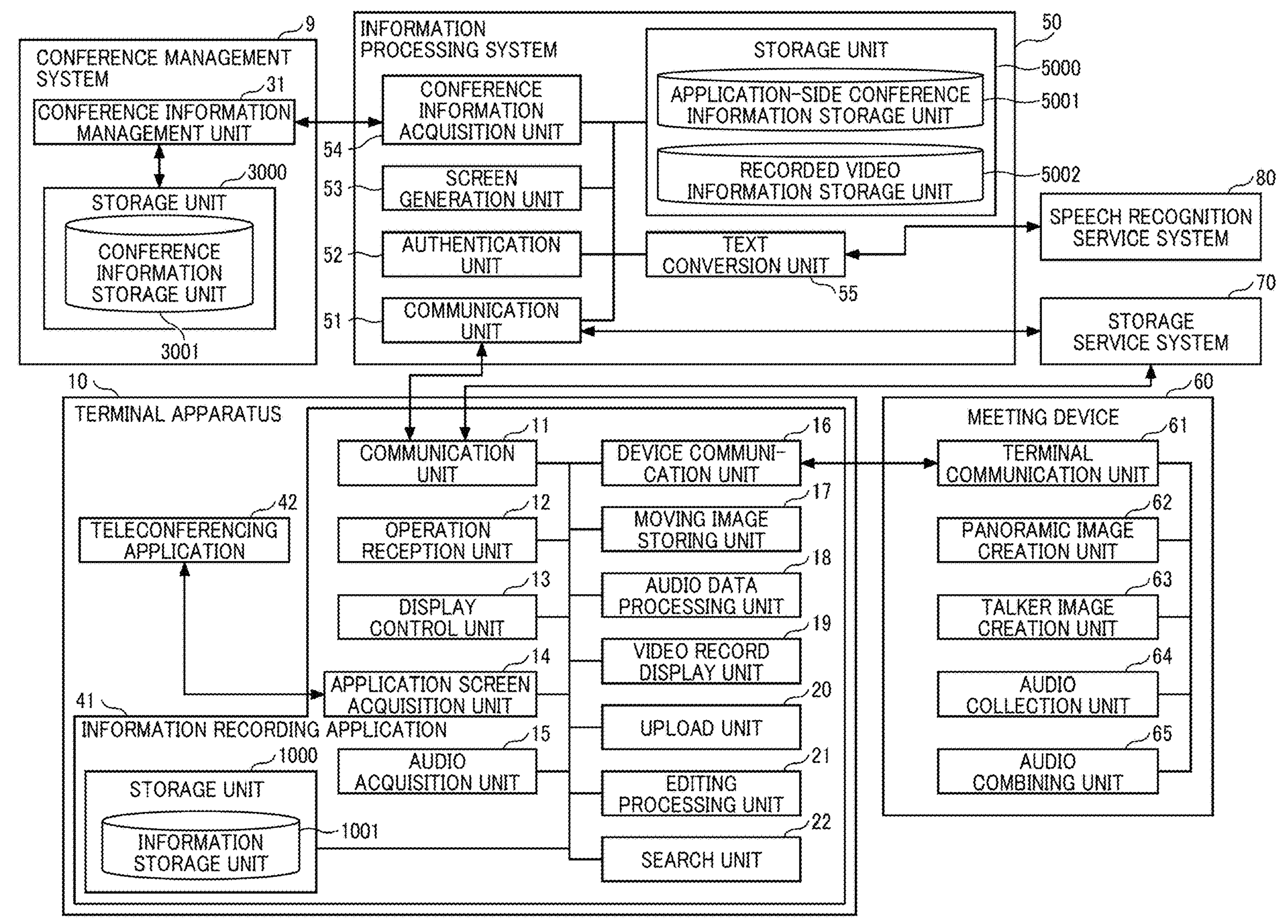
FIG. 7
CONFERENCE MANAGEMENT SYSTEM
9
CONFERENCE INFORMATION MANAGEMENT UNIT
31
STORAGE UNIT
3000
CONFERENCE INFORMATION STORAGE UNIT
3001
INFORMATION PROCESSING SYSTEM
50
CONFERENCE INFORMATION ACQUISITION UNIT
54
SCREEN GENERATION UNIT
53
AUTHENTICATION UNIT
52
COMMUNICATION UNIT
51
STORAGE UNIT
5000
APPLICATION-SIDE CONFERENCE INFORMATION STORAGE UNIT
5001
RECORDED VIDEO INFORMATION STORAGE UNIT
5002
TEXT CONVERSION UNIT
55
SPEECH RECOGNITION SERVICE SYSTEM
80
STORAGE SERVICE SYSTEM
70
TERMINAL APPARATUS
10
TELECONFERENCING APPLICATION
42
INFORMATION RECORDING APPLICATION
41
STORAGE UNIT
1000
INFORMATION STORAGE UNIT
1001
COMMUNICATION UNIT
11
OPERATION RECEPTION UNIT
12
DISPLAY CONTROL UNIT
13
APPLICATION SCREEN ACQUISITION UNIT
14
AUDIO ACQUISITION UNIT
15
DEVICE COMMUNI-CATION UNIT
16
MOVING IMAGE STORING UNIT
17
AUDIO DATA PROCESSING UNIT
18
VIDEO RECORD DISPLAY UNIT
19
UPLOAD UNIT
20
EDITING PROCESSING UNIT
21
SEARCH UNIT
22
MEETING DEVICE
60
TERMINAL COMMUNICATION UNIT
61
PANORAMIC IMAGE CREATION UNIT
62
TALKER IMAGE CREATION UNIT
63
AUDIO COLLECTION UNIT
64
AUDIO COMBINING UNIT
65

FIG. 8

| CONFERENCE ID | RECORDED VIDEO ID | UPDATE DATE AND TIME | TITLE | UPLOAD | STORAGE DESTINATION |
|---|---|---|---|---|---|
| 091 | 151 | 20XX/1/25 10:30 | DESIGN CONFERENCE | – | |
| 091 | 152 | 20XX/1/25 10:50 | DESIGN CONFERENCE | – | |
| 109 | 198 | 20XX/1/27 14:30 | DEVELOPMENT CONFERENCE | DONE | http://sample.com/file/ ... |
| 123 | 250 | 20XX/1/28 15:00 | PATENT CONFERENCE | DONE | http://sample.com/file/ ... |
| ... | ... | ... | ... | ... | ... |

FIG. 9

| ITEM | CONTENT |
| --- | --- |
| CONFERENCE ID | IDENTIFICATION INFORMATION OF CONFERENCE |
| APPLICATION ID | IDENTIFICATION INFORMATION OF INFORMATION RECORDING APPLICATION |
| USER ID OF ACCESS TOKEN RECIPIENT | IDENTIFICATION INFORMATION OF USER WHO RECEIVES ACCESS TOKEN |
| URL OF ACCESS TOKEN ISSUER | URL OF STORAGE SERVICE SYSTEM |
| ISSUANCE DATE AND TIME | DATE AND TIME OF ISSUANCE OF ACCESS TOKEN |
| EFFECTIVE DATE AND TIME | DATE AND TIME WHEN ACCESS TOKEN BECOMES EFFECTIVE |
| EXPIRATION DATE | EXPIRATION DATE OF ACCESS TOKEN |
| PERMISSION INFORMATION | PERMISSIONS GIVEN BY ACCESS TOKEN |
| DISPLAY NAME | DISPLAY NAME OF USER IN INFORMATION RECORDING APPLICATION |
| FIRST NAME | FIRST NAME OF USER |
| LAST NAME | LAST NAME OF USER |
| ... | ... |

FIG. 10

| CONFERENCE ID | RECORDED VIDEO ID | UPDATE DATE AND TIME | TITLE | UPLOAD | STORAGE DESTINATION |
| --- | --- | --- | --- | --- | --- |
| 001 | 001 | 20XX/1/5 11:00 | ABC CONFERENCE | DONE | http://sample.com/file/ ... |
| 002 | 002 | 20XX/1/5 10:00 | DEF CONFERENCE | DONE | http://sample.com/file/ ... |
| 003 | 003 | 20XX/1/6 15:00 | GHI CONFERENCE | DONE | http://sample.com/file/ ... |
| ... | ... | ... | ... | ... | ... |

FIG. 11

| ITEM | CONTENT |
| --- | --- |
| CONFERENCE ID | IDENTIFICATION INFORMATION OF CONFERENCE |
| TENANT ID | IDENTIFICATION INFORMATION OF TENANT |
| TITLE | SUBJECT OF CONFERENCE |
| HOST | USER INFORMATION OF HOST |
| PARTICIPANT | PARTICIPANT LIST |
| ACCESSIBLE USER | LIST OF USERS AUTHORIZED TO ACCESS CONFERENCE RESOURCES |
| AD-HOC PARTICIPANT | LIST OF GUEST PARTICIPANTS |
| LOCATION | NAME OF CONFERENCE ROOM |
| START TIME | CONFERENCE START TIME |
| END TIME | CONFERENCE END TIME |
| CONFERENCE CREATOR | USER ID OF CONFERENCE CREATOR |
| PASSWORD | CONFERENCE PASSWORD |

FIG. 12

| ID | time | user | text |
|---|---|---|---|
| 1 | 00:01:00 | 1 | It keyword it |
| : | : | : | : |
| 33 | 00:40:10 | 1 | good idea |
| : | : | : | : |
| 89 | 01:12:10 | 2 | That keyword it |
| : | : | : | : |
| 101 | 02:20:50 | 2 | This is the result |
| : | : | : | : |
| 122 | 03:01:30 | 1 | This keyword it |
| ••• | ••• | ••• | ••• |

FIG. 23
(a)
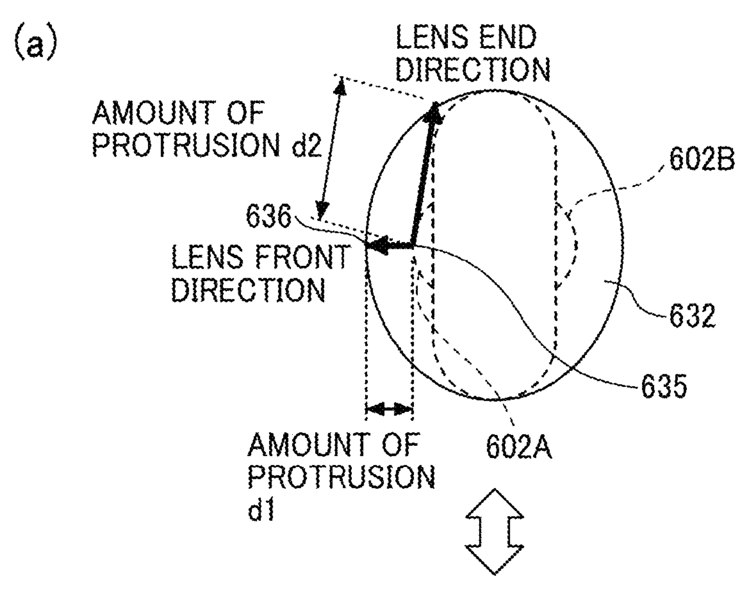
(b)
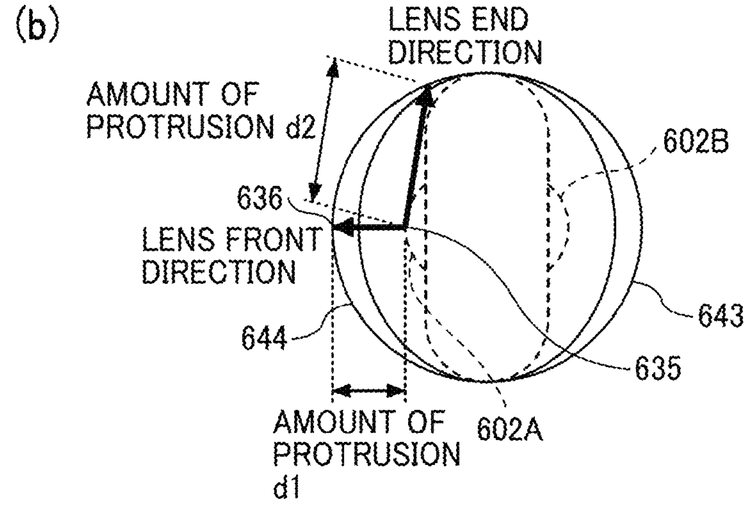

210
Recording starts with the following settings.
Camera
211
PC screen
212
Select a screen
213
Only audio is recorded.
214
Automatically transcribe audio recordings after uploading the recordings
215
Cancel
Start recording now
216

220
Overview
Member
Tag
Note
Obtain information from calendar
221
Conference name
222
Design conference
Date/Time
223
Jan. 25/10:00–11:00
Location
224
Conference room A
201
202
Fixed display
Change front
Left aligned if there is any key not to be displayed.
No display switching is performed when the zoom setting is off.
Display:
225
REC
203
204
Pause
HH:MM:SS
100%
226
227
End recording 240
Overview
Member
Tag
Note
Obtain information from calendar
221
Conference name
222
Design conference
Date/Time
223
Jan. 25/10:00–11:00
Location
224
Conference room A
Design conference
csv. Export
Share
Login
Upload video
Edit video
A
B
C
D
A
241
00:00:00/00:00:00
0.0x
241d
241b
241a
241c
241e
241f
Automatic transcription
Automatic scroll
Search conversation
242
244
245
16:31
The XX product is ...
16:32
The second-quarter event is ...
16:33
I agree with you on ...
243

Overview
260
261
262
A
B
C
D
0.0x
00:00:00/00:00:00
10
241a
241b
241c
241d
241e
241f
Delete
OK

IMAGE CAPTURING DEVICE AND PANORAMIC IMAGE CREATION METHOD

CROSS-REFERENCE TO RELATED APPLICATIONS

This patent application is based on and claims priority pursuant to 35 U.S.C. § 119(a) to Japanese Patent Application No. 2023-193162, filed on Nov. 13, 2023, in the Japan Patent Office, the entire disclosure of which is hereby incorporated by reference herein.

BACKGROUND

Technical Field

The present disclosure relates to an image capturing device and a panoramic image creation method.

Related Art

A teleconference service system of the related art transmits images and audio from one site to one or more other sites in real time to allow users at remote sites to have a conference using the images and the audio. An image capturing device of the related art captures a 360-degree omnidirectional image.

A technique has been developed for reducing color discontinuities that may occur at image boundaries when a plurality of images captured by an image capturing device are combined. For example, a white balance evaluation value is calculated for each area of a plurality of captured images, a brightness adjustment value or a white balance adjustment value is calculated based on evaluation values of overlapping areas between captured images, and a weighted average of white balance adjustment values is obtained for each divided area. A smoothed white balance adjustment value is determined for each divided area to reduce color discontinuities that may occur at image boundaries when a plurality of captured images are combined.

SUMMARY

According to an embodiment of the present disclosure, an image capturing device for capturing an image at an angle of view of approximately 360 degrees in a horizontal direction includes a plurality of lenses and an upper hood. The plurality of lenses have an optical axis in the horizontal direction. The upper hood shields incidence of light on the plurality of lenses from directly above. The upper hood limits an incident angle of light to an angle greater than or equal to approximately 30 degrees and less than or equal to approximately 67 degrees. The incident angle is defined by a direction in which light from above is incident on each of the plurality of lenses at a maximum angle and the optical axis of the plurality of lenses.

According to an embodiment of the present disclosure, a panoramic image creation method is executed by an image capturing device for capturing an image at an angle of view of approximately 360 degrees in a horizontal direction. The image capturing device includes a plurality of lenses having an optical axis in the horizontal direction, and an upper hood to shield incidence of light on the plurality of lenses from directly above. The upper hood limits an incident angle of light to an angle greater than or equal to approximately 30 degrees and less than or equal to approximately 67 degrees. The incident angle is defined by a direction in which light from above is incident on each of the plurality of lenses at a maximum angle and the optical axis of the plurality of lenses. The panoramic image creation method includes generating an image that covers an angle greater than 180 degrees in the horizontal direction using a plurality of imaging elements each corresponding to one of the plurality of lenses, the plurality of imaging elements including a first imaging element and a second imaging element; performing pattern matching on an edge portion of a first image generated by the second imaging element using an edge portion of a second image generated by the first imaging element to identify stitching portions of the first image and the second image having a highest similarity; and stitching the first image and the second image together in the stitching portions to create a panoramic image that covers approximately 360 degrees in the horizontal direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a diagram illustrating an overview of creation of an information record to store a screen of an application executed during a teleconference and a panoramic image of surroundings, according to one or more embodiments of the present disclosure;

FIG. 3 is a diagram illustrating a hardware configuration of an information processing system and a terminal apparatus according to one embodiment of the present disclosure;

FIG. 4 is a diagram of a hardware configuration of a meeting device according to one embodiment of the present disclosure;

FIG. 5A and FIG. 5B are views of the meeting device, illustrating an image capturing range of the meeting device according to one embodiment of the present disclosure;

FIG. 7 is a block diagram illustrating, in blocks, functions of the terminal apparatus, the meeting device, and the information processing system of the information record display system according to one embodiment of the present disclosure;

FIG. 8 is a table illustrating moving image recording information stored in an information storage unit according to one embodiment of the present disclosure;

FIG. 9 is a table illustrating application-side conference information stored in an application-side conference information storage unit according to one embodiment of the present disclosure;

FIG. 10 is a table illustrating recorded video information stored in a recorded video information storage unit according to one embodiment of the present disclosure;

FIG. 11 is a table illustrating conference information stored in a conference information storage unit according to one embodiment of the present disclosure;

FIG. 12 is a diagram illustrating a structure of text data stored in a storage service system according to one embodiment of the present disclosure;

FIG. 23 is a view of light shielding members of the upper hood according to one embodiment of the present disclosure;

Figure 2:
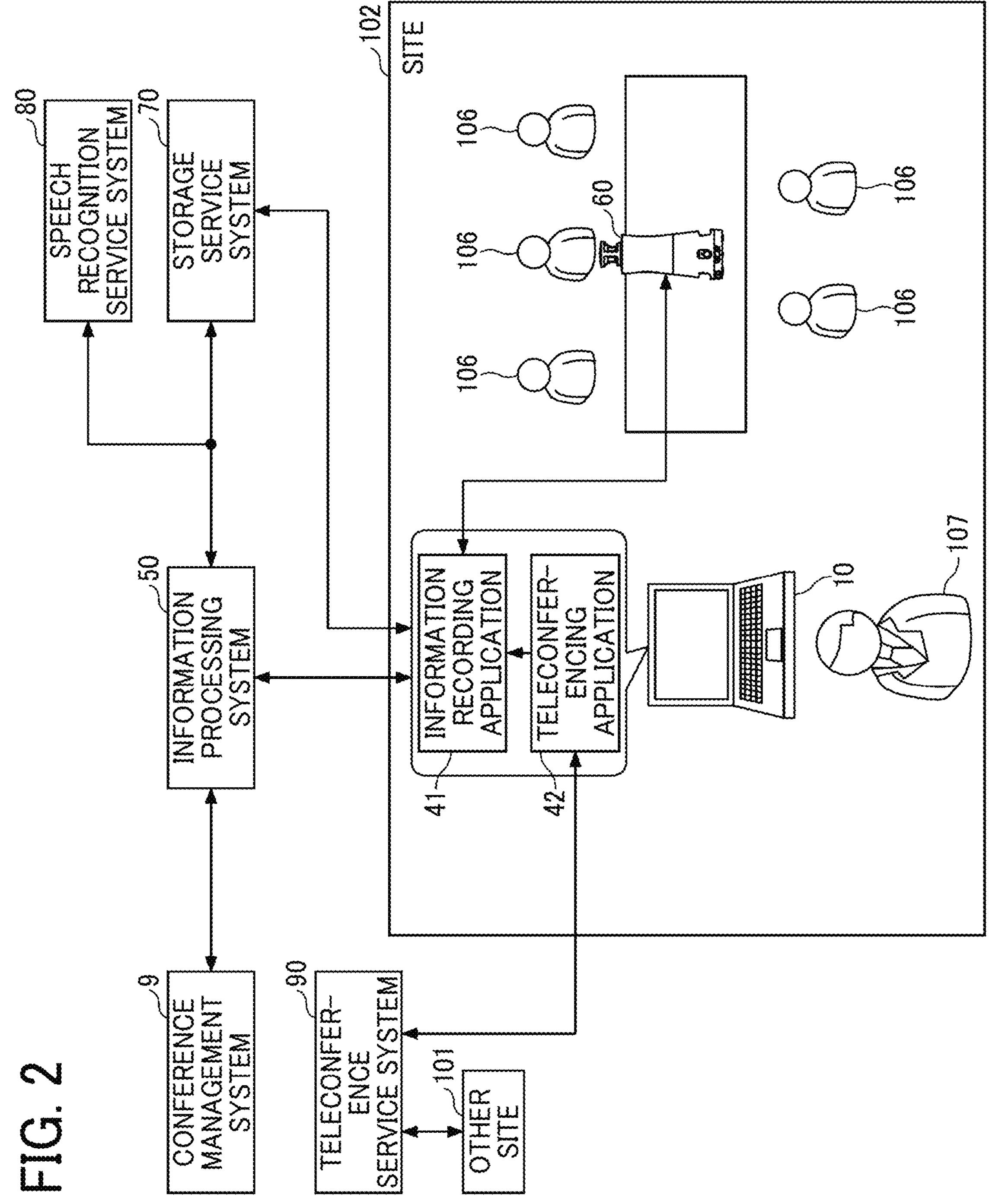
FIG. 2 is a diagram illustrating a configuration of an information record display system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

One of the challenges of the related art is that overhead light incident on the image capturing device from, for example, a ceiling light reduces image quality. For example, in an image having artifacts such as flare or ghosting, the face or the like of a participant in a meeting is less recognizable. Reduced image quality may make image boundaries less smooth or cause images to be shifted with respect to each other when a plurality of images are stitched together to generate a 360-degree image. Image processing for reducing such discontinuities that may occur at image boundaries has a high processing load. It is therefore difficult to perform the image processing in real time.

In view of the above, an information record display system and a panoramic image creation method performed by the information record display system will be described hereinafter as an example of embodiments of the present disclosure.

Example of Method for Creating Minutes of Teleconference

Figure 1:
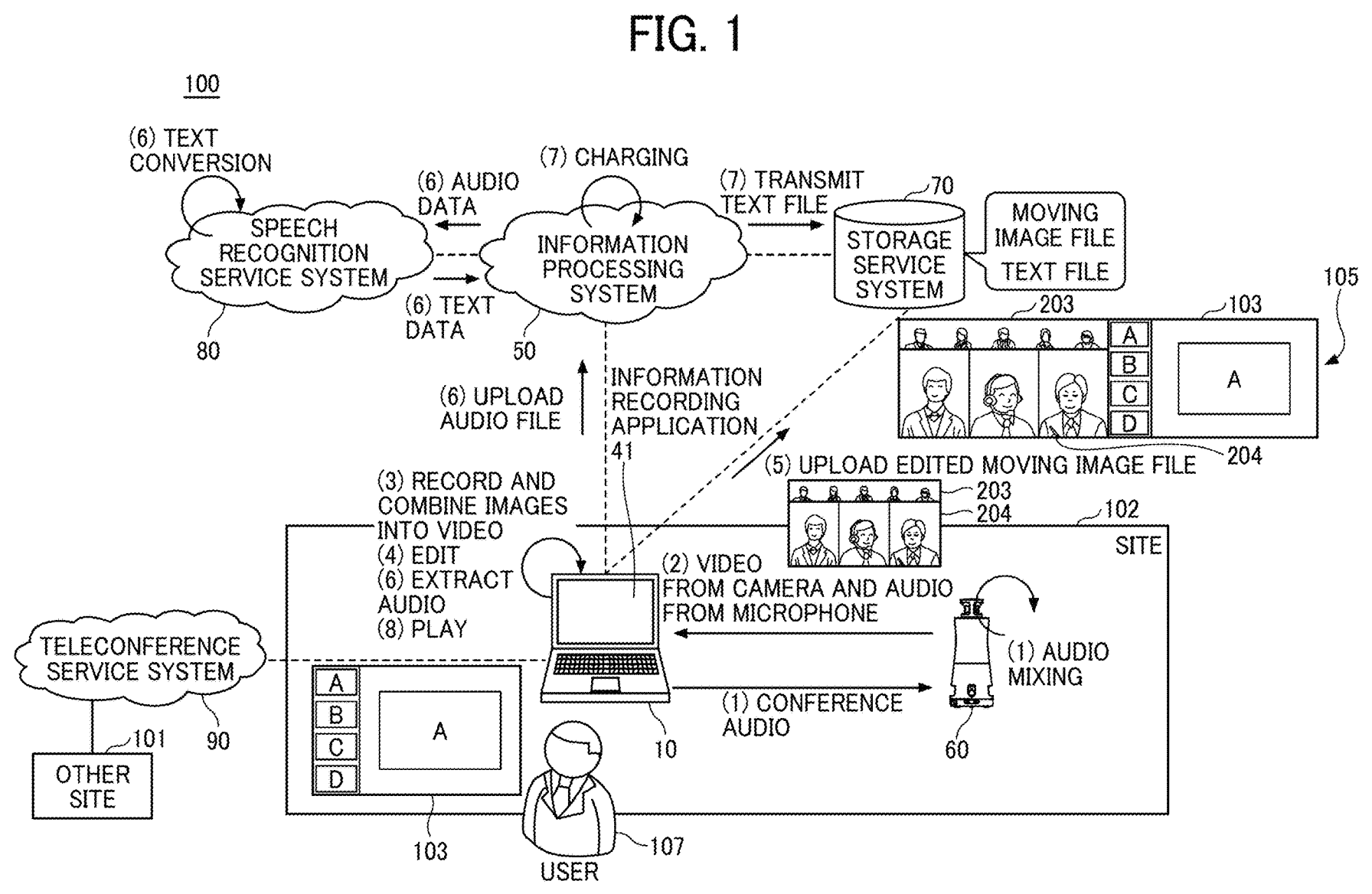

An overview of a method for creating the minutes of a teleconference using a panoramic image and an application screen will be described with reference to FIG. 1. FIG. 1 is a diagram illustrating an overview of creation of an information record to store a screen of an application executed during the teleconference and a panoramic image of surroundings. As illustrated in FIG. 1, a user 107 at a site 102 uses a teleconference service system 90 to have a teleconference with a user at another site 101.

In one embodiment, an information record display system 100 includes a meeting device 60 and a terminal apparatus 10. The meeting device 60 includes an image capturing means that captures an image of 360-degree surroundings, a microphone, and a speaker. The meeting device 60 processes information on the captured image of the surroundings to obtain a horizontal panoramic image (hereinafter referred to as a panoramic image). The information record display system 100 uses the panoramic image and a screen created by an application (hereinafter referred to as an app, as appropriate) executed by the terminal apparatus 10 to create an information record (e.g., the minutes of the teleconference). The information record display system 100 combines audio received by a teleconferencing application 42 (FIG. 2) and audio acquired by the meeting device 60 to generate combined audio, and includes the combined audio in the information record. In the present embodiment, the information record display system 100 may display (or play) the information record to enable the user to view the information record, without creating the information record. An overview of the information record display system 100 will be described hereinafter.

(1) On the terminal apparatus 10, an information recording application 41 described below and the teleconferencing application 42 are operating. Another application such as an application for displaying a document may also be operating on the terminal apparatus 10. The information recording application 41 transmits audio output from the terminal apparatus 10 (including audio received by the teleconferencing application 42 from the other site 101) to the meeting device 60. The meeting device 60 mixes (or combines) audio acquired by the meeting device 60 and the audio received by the teleconferencing application 42.

(2) The meeting device 60 performs a process of clipping an image of a talker who is speaking from a panoramic image, based on a direction in which the microphone of the meeting device 60 captures audio, to create a talker image (an example of talker image information). The meeting device 60 transmits both the panoramic image and the talker image to the terminal apparatus 10.

(3) The information recording application 41 operating on the terminal apparatus 10 displays a panoramic image 203 and talker images 204. The information recording application 41 stores an application screen selected by the user (e.g., a screen 103 of the teleconferencing application 42), the panoramic image 203, and the talker images 204. The application screen is an example of screen information (described below) displayed by each application such as the teleconferencing application 42. The application screen, the panoramic image 203, and the talker images 204 are repeatedly stored and are stored as separate moving images. The application screen, the panoramic image 203, and the talker images 204 are hereinafter simply referred to as a "video record", unless otherwise distinguished from one another.

(4) The information recording application 41 receives an editing operation such as cropping undesired parts by the user and completes the video record. The video record is a portion of the information record.

(5) The information recording application 41 transmits the video record and the audio data to a storage service system 70 to store the video record and the audio data in the storage service system 70.

(6) The information recording application 41 transmits the audio data and a request to an information processing system 50 to convert the audio data into text data. The information processing system 50 receives the audio data and transmits the audio data to a speech recognition service system 80 that converts audio data into text data. The speech recognition service system 80 converts the audio data into text data. The text data also includes data indicating the elapsed time from the start of recording to the point at which the text corresponding to the text data is uttered.

In the case of real-time conversion into text data, the meeting device 60 transmits the audio data directly to the information processing system 50.

(7) The information processing system 50 transmits the text data to the storage service system 70 to store the text data in addition to the video record that has been stored. The text data is a portion of the information record.

In one embodiment, the information processing system 50 performs a process of charging the user a fee according to a service used. The fee is calculated based on, for example, the size of the text data, the file size of the video record, or the processing time.

(8) The information recording application 41 plays the video record together with the audio data. The information recording application 41 also displays the text data in correspondence with the video record. In one example of the arrangement of the panoramic image 203, the talker images 204, and the screen 103 of the teleconferencing application 42, the panoramic image 203 and the talker images 204 are on the left, and the screen 103 of the teleconferencing application 42 is on the right.

As described above, when the video record is played, a panoramic image of the user and surroundings, talker images, and a screen of an application executed during the teleconference, such as the teleconferencing application 42, are displayed. Therefore, when a participant or a non-participant in the teleconference views the video record as the minutes of the teleconference, the panoramic image, the talker images, and the screen of the application are displayed on one screen. Thus, the scenes of the teleconference are reproduced with reality.

Terminology

The term "application" or "app" refers to software developed or used for a specific function or purpose. Types of such applications include a native application and a web application. A web application (a cloud application that provides a cloud service) may operate in cooperation with a native application or a web browser.

The term "image capturing device" refers to a device configured to capture an image of the surroundings of the image capturing device. In one example, the image capturing device collects surrounding sounds.

In the present embodiment, the meeting device 60 is used as an example of the image capturing device. The meeting device 60 is configured to capture an image of the surroundings of the meeting device 60 and collects surrounding sounds. The meeting device 60 may include a device used in connection with a terminal apparatus, a built-in device of a terminal apparatus, and a device used in connection with a cloud service without being directly connected to a terminal apparatus.

The meeting device 60 captures an image of the surroundings thereof in a space surrounding the meeting device 60 (e.g., an area or a space of, for example, 180 degrees to 360 degrees in the horizontal direction) to acquire image information and performs predetermined processing on image information of a curved surface captured by the meeting device 60 to acquire an image. The predetermined processing includes various processes for creating image information of the surroundings from information on the captured image. Examples of the predetermined processing include flattening processing to be performed on a captured image of the curved surface. The predetermined processing may include a process of creating an image of the surroundings, a process of clipping a talker image, and a process of combining the image of the surroundings and the talker image. In the present embodiment, the image of the surroundings is described using the term "panoramic image". The panoramic image is an image having an angle of view of 180 degrees to 360 degrees in substantially the horizontal direction. In one example, the panoramic image is captured using, instead of one meeting device, a combination of multiple image capturing devices having an ordinary angle of view. In the present embodiment, the meeting device 60 is installed at a place such as on a table for use in conferencing at the site 102 or identifying surrounding circumstances. In another embodiment, the meeting device 60 may also be a device used for monitoring (for surveillance purposes such as security or disaster risk reduction), watching (for care such as childcare or eldercare), or on-site scene analysis (for solutions, marketing, or other purposes).

The term "information record" refers to information to be recorded by the information recording application 41 and information stored or saved in a viewable manner in association with identification information of a certain conference (or meeting). Examples of the information record include:

- moving image information created based on screen information displayed by a selected application (e.g., a teleconferencing application) and image information of the surroundings of a device, which is acquired by the device;
- combined audio information including audio information acquired by the teleconferencing application (terminal apparatus) and audio information acquired by a meeting device located at a site during the conference (or meeting);
- text information converted from the acquired audio information; and
- other data and images that are related information related to the conference (or meeting). The other data and images include, for example, a document file used during the conference, an added memo, translated data of the text information, images and stroke data created by a cloud electronic whiteboard service during the conference.

When the information recording application 41 records the screen of the teleconferencing application 42 and images of scenes of the conference at the site 102, the information record may serve as the minutes of the conference that is held. The minutes are an example of the information record. The information record may be interchangeably referred to as, for example, a communication record or a site circumstance record according to the content of the teleconference or an activity performed at the site 102. The information record includes, for example, files of a plurality of formats such as a recorded video file (e.g., a combined moving image), an audio file, a text data file (text data obtained by speech recognition of audio), a document file, an image file, and a spreadsheet file. Such files are associated with identification information of the conference. Thus, the files are viewable in time series selectively or collectively when accessed.

The term "tenant" refers to a group of users, such as a company, a local government, or an organization as part of such a company or local government, that has a contract to receive a service from a service provider. In the present embodiment, creation of the information record and conversion into text data are performed under a contract that the tenant has with the service provider.

The term "telecommunication" refers to audio-and-video-based communication between entities at physically remote sites using software and terminal apparatuses. An example of telecommunication is a teleconference. A conference may also be referred to as an assembly, a meeting, an arrangement, a consultation, an application for a contract or the like, a gathering, a get-together, a briefing, a seminar, a workshop, a study meeting, a study session, a training session, or the like.

The term "site" refers to a place where an activity takes place. An example of the site is a conference room. The conference room is a room provided for conferences. The term "site" is also used to include various places such as a home, a reception desk, a store, a warehouse, and an outdoor site, and may refer to any place or space where a terminal apparatus, a device, or the like is installable.

The term "audio" refers to the sounds of an utterance made by a person, ambient sounds, or the like. The term "audio data" refers to data obtained by converting the audio. In the present embodiment, the audio and the audio data are not strictly distinguished from each other.

Example of System Configuration

A system configuration of the information record display system 100 will be described with reference to FIG. 2. FIG. 2 illustrates an example configuration of the information record display system 100. FIG. 2 illustrates one of a plurality of sites across which a teleconference is held. Specifically, FIG. 2 illustrates the site 102. The terminal apparatus 10 at the site 102 communicates with the information processing system 50, the storage service system 70, and the teleconference service system 90 via a network. The meeting device 60 is placed at the site 102. The terminal apparatus 10 is communicably connected to the meeting device 60 via, for example, a universal serial bus (USB) cable.

At least the information recording application 41 and the teleconferencing application 42 operate on the terminal apparatus 10. In one embodiment, the teleconferencing application 42 communicates with a terminal apparatus at the other site 101 via the teleconference service system 90 residing on the network to allow the user 107 at the site 102 and the user at the other site 101 to remotely participate in the teleconference. The information recording application 41 uses functions of the information processing system 50 and the meeting device 60 to create an information record for the teleconference performed by the teleconferencing application 42.

In the present embodiment, an information record is created during a teleconference, by way of example. In another example, an information record may be created for a conference based on communication across remote sites. That is, an information record may be created for a conference in which participants at one site participate. In this case, audio collected by the meeting device 60 is stored without being combined. The rest of the processing performed by the information recording application 41 is the same.

The terminal apparatus 10 includes a built-in camera having an ordinary angle of view. In another example, instead of or in addition to the built-in camera, an external camera connectable to the terminal apparatus 10 is provided. The camera captures an image of an area in front of the terminal apparatus 10, including the user 107 operating the terminal apparatus 10. With the ordinary angle of view, a non-panoramic image is obtained. In the present embodiment, a flat image that is not a curved-surface image such as a spherical image is obtained. The terminal apparatus 10 further includes a built-in microphone. In another example, instead of or in addition to the built-in microphone, an external microphone attachable to the terminal apparatus 10 is provided. The microphone collects surrounding sounds such as the audio of the user 107 operating the terminal apparatus 10. This configuration allows the user 107 to have a common teleconference using the teleconferencing application 42 without paying attention to the information recording application 41. The information recording application 41 and the meeting device 60 do not affect the teleconferencing application 42, except for an increase in the processing load of the terminal apparatus 10. In one embodiment, the teleconferencing application 42 transmits a panoramic image or a talker image captured by the meeting device 60 to the teleconference service system 90.

The information recording application 41 is an application that creates an information record through communication with the meeting device 60 to record information. The meeting device 60 is a device for a meeting, including an image capturing device for capturing a panoramic image, a microphone, and a speaker. The camera of the terminal apparatus 10 captures an image of a limited area in front of the terminal apparatus 10. In contrast, the meeting device 60 captures an image of the entire area around the meeting device 60. Note that the image captured by the meeting device 60 does not necessarily cover the entire area around the meeting device 60. In one embodiment, the meeting device 60 keeps a plurality of participants 106 illustrated in FIG. 2 within the angle of view.

Further, the meeting device 60 clips a talker image from a panoramic image and combines the audio acquired by the meeting device 60 and the audio output from the terminal apparatus 10 (including the audio received by the teleconferencing application 42). In one example, the meeting device 60 is installed at a place, for example, but not limited to, on a desk or a table. The meeting device 60 may be installed at any location in the site 102. Since the meeting device 60 is configured to capture a spherical image, the meeting device 60 may be installed on the ceiling. In another example, the meeting device 60 may be installed at a different site or at any site.

The information recording application 41 displays a list of applications operating on the terminal apparatus 10, stores the information record described above, displays (or plays) the video record, and receives editing, for example. The information recording application 41 further displays a list of teleconferences that have been held or are scheduled to be held, for example. The list of teleconferences is used in information related to the information record, and, in one example, the user links a teleconference with the information record.

The teleconferencing application 42 is an application that connects to and communicates with another terminal apparatus at the other site 101, transmits and receives an image and audio, displays the image, and outputs the audio, for example, to make the terminal apparatus 10 perform telecommunication with the other terminal apparatus. The teleconferencing application 42 may be referred to as, for example, a telecommunication application or a remote information sharing application.

The information recording application 41 and the teleconferencing application 42 may be each either a web application or a native application. The web application is an application in which a program on a web server and a program on a web browser or a native application cooperate with each other to perform processing. The web application is an application not to be installed on the terminal apparatus 10. The native application is an application to be installed and used on the terminal apparatus 10. In the present embodiment, the information recording application 41 and the teleconferencing application 42 are native applications.

In one example, the terminal apparatus 10 is a general-purpose information processing apparatus having a communication function, such as a PC, a smartphone, or a tablet terminal. In another example, the terminal apparatus 10 is an electronic whiteboard, a game console, a personal digital assistant (PDA), a wearable PC, a car navigation system, an industrial machine, a medical device, or a networked home appliance. The terminal apparatus 10 is any apparatus on which at least the information recording application 41 and the teleconferencing application 42 operate.

The information processing system 50 includes one or more information processing apparatuses residing on a network. The information processing system 50 includes one or more server applications that perform processing in cooperation with the information recording application 41, and an infrastructure service. The server applications manage a list of teleconferences, an information record indicating the record of a teleconference, various settings and storage paths, and so on. The infrastructure service performs user authentication, makes a contract, and performs charging processing, for example.

All or some of the functions of the information processing system 50 may reside in a cloud environment or in an on-premises environment. In one example, the information processing system 50 includes a plurality of server apparatuses. In another example, the information processing system 50 includes one information processing apparatus. For example, the server applications and the infrastructure service may be provided by separate information processing apparatuses, and an information processing apparatus may be present for each of the functions of the server applications. The information processing system 50 may be integral with a conference management system 9 described below, the storage service system 70, and the speech recognition service system 80.

The conference management system 9 is a system that manages information related to a conference held in a tenant in which the information processing system 50 is used. The information processing system 50 acquires conference information from the conference management system 9 and manages the conference information in association with an information record.

The storage service system 70 is a storage means residing on a network and provides a storage service for accepting storage of files and the like. Examples of the storage service system 70 include OneDrive®, Google Workspace®, and Dropbox®. The storage service system 70 may be, for example, an on-premises network-attached storage (NAS) system.

The speech recognition service system 80 provides a service of performing speech recognition on audio data and converting the audio data into text data. The speech recognition service system 80 may be a general-purpose commercial service or may be implemented by some of the functions of the information processing system 50. The speech recognition service system 80 may include different service systems set and used for respective users, tenants, or conferences.

Example of Hardware Configuration

A hardware configuration of the information processing system 50 and the terminal apparatus 10 according to the present embodiment will be described with reference to FIG. 3.

Information Processing System and Terminal Apparatus

FIG. 3 is a diagram illustrating an example of the hardware configuration of the information processing system 50 and the terminal apparatus 10 according to the present embodiment. As illustrated in FIG. 3, each of the information processing system 50 and the terminal apparatus 10 is implemented by a computer and includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

The CPU 501 controls the overall operations of the information processing system 50 and the terminal apparatus 10. The ROM 502 stores programs such as an initial program loader (IPL) to boot the CPU 501. The RAM 503 is used as a work area for the CPU 501. The HD 504 stores various types of data such as a program. The HDD controller 505 controls reading or writing of various types of data from or to the HD 504 under control of the CPU 501. The display 506 displays various types of information such as a cursor, a menu, a window, characters, or an image. The external device connection I/F 508 is an interface for connecting to various external devices. The external devices include, for example, but are not limited to, a USB memory and a printer. The network I/F 509 is an interface for performing data communication using a network. The bus line 510 is, for example, an address bus or a data bus for electrically connecting the components illustrated in FIG. 3, such as the CPU 501, with each other.

The keyboard 511 is an example of an input means that includes a plurality of keys for inputting characters, numerical values, various instructions, or the like. The pointing device 512 is an example of an input means to be used for, for example, selecting or executing various instructions, selecting a target for processing, or moving a cursor being displayed. The optical drive 514 controls reading or writing of various types of data from or to an optical storage medium 513 serving as an example of a removable recording medium. Examples of the optical storage medium 513 include, but are not limited to, a compact disc (CD), a digital versatile disc (DVD), and a Blu-ray disc. The medium I/F 516 controls reading or writing (storing) of data from or to a recording medium 515 such as a flash memory.

Meeting Device

A hardware configuration of the meeting device 60 will be described with reference to FIG. 4. FIG. 4 illustrates an example of the hardware configuration of the meeting device 60 that captures a 360-degree moving image of the surroundings.

In the following description, the meeting device 60 is a device that uses imaging elements to capture a 360-degree moving image of the surroundings of the meeting device 60 at a predetermined height, and two or more imaging elements may be used. The meeting device 60 may be a non-dedicated device. In one example, an external imaging unit for capturing a 360-degree moving image is attached to a PC, a digital camera, a smartphone, or the like to implement substantially the same functions as those of the meeting device 60.

As illustrated in FIG. 4, the meeting device 60 includes an imaging unit 601, an image processor 604, an image-capturing controller 605, a microphone 608, a speaker 619, an audio processor 609, a CPU 611, a ROM 612, a static random access memory (SRAM) 613, a dynamic random access memory (DRAM) 614, an operation device 615, an external device connection I/F 616, a communication device 617, an antenna **617*a*, and a sound sensor 618. The imaging unit 601 includes wide-angle lenses (so-called fisheye lenses) (hereinafter simply referred to as "lenses") 602*a* and 602*b* each having an angle of view of 360 degrees to form a hemispherical image. The imaging unit 601 further includes imaging elements (image sensors) 603*a* and 603*b* provided for the lenses 602*a* and 602*b***, respectively.

Each of the imaging elements **603*a* and 603*b* includes an image sensor such as a complementary metal oxide semiconductor (CMOS) sensor or a charge coupled device (CCD) sensor, a timing generation circuit, and a group of registers. The image sensor converts an optical image formed by the corresponding one of the lenses 602*a* and 602*b* into an electric signal and outputs image data. The timing generation circuit generates horizontal or vertical synchronization signals, pixel clocks, and the like for the image sensor. In the group of registers, various commands, parameters, and the like for an operation of the corresponding one of the imaging elements 603*a* and 603*b* are set. The imaging unit 601 may be a 360-degree camera and is an example of an image capturing means that captures a 360-degree image of the surroundings of the meeting device 60. In another example, the imaging unit 601** combines a plurality of items of information acquired by a plurality of imaging elements (e.g., two imaging elements each having angle of view of 180 degrees) to achieve an angle of view of 360 degrees.

Each of the imaging elements (image sensors) **603*a* and 603*b* of the imaging unit 601 is connected to the image processor 604 via a parallel I/F bus. Each of the imaging elements 603*a* and 603*b* of the imaging unit 601 is also connected to the image-capturing controller 605 via a serial I/F bus such as an inter-integrated circuit (I2C) bus. The image processor 604, the image-capturing controller 605, and the audio processor 609 are connected to the CPU 611 via a bus 610. The ROM 612, the SRAM 613, the DRAM 614, the operation device 615, the external device connection I/F 616, the communication device 617, the sound sensor 618, and the like are also connected to the bus 610**.

The image processor 604 obtains image data (such as fisheye video) output from each of the imaging elements **603*a* and 603*b* through the parallel I/F bus and performs predetermined processing on the image data to create data of a panoramic image and data of a talker image from the fisheye video. Further, the image processor 604** combines the panoramic image, the talker image, and the like and outputs a combined moving image.

The image-capturing controller 605 usually serves as a master device, whereas the imaging elements **603*a* and 603*b* usually serve as a slave device. The image-capturing controller 605 sets commands and the like in the groups of registers of the respective imaging elements 603*a* and 603*b* through the I2C bus. The image-capturing controller 605 receives the commands and the like from the CPU 611. The image-capturing controller 605 further obtains status data in the groups of registers of the respective imaging elements 603*a* and 603*b* through the I2C bus. The image-capturing controller 605 then sends the obtained status data to the CPU 611**.

The image-capturing controller 605 instructs the imaging element 603*a* (first imaging element) and the imaging element 603*b* (second imaging element) to output image data at a time when an image-capturing start button of the operation device 615 is pressed or a time when the image-capturing controller 605 receives an image-capturing start instruction from the CPU 611. The meeting device 60 may have functions corresponding to a preview display function and a moving image display function implemented by a display (e.g., a display of a PC or a smartphone). In this case, the image data is continuously output from the imaging elements 603*a* and 603*b* at a predetermined frame rate (frames/minute).

As described below, the image-capturing controller 605 operates in cooperation with the CPU 611 to synchronize the time at which the imaging element 603*a* outputs image data with the time at which the imaging element 603*b* outputs the image data. In the present embodiment, the meeting device 60 does not include a display. However, in some embodiments, the meeting device 60 may include a display.

The microphone 608 converts sound into audio (signal) data. The audio processor 609 receives the audio data output from the microphone 608 through an I/F bus and performs predetermined processing on the audio data. The audio processor 609 modulates or amplifies audio data received from the terminal apparatus 10 and outputs the audio data from the speaker 619.

The CPU 611 controls the overall operation of the meeting device 60 and performs processing. The ROM 612 stores various programs to be executed by the CPU 611.

Each of the SRAM 613 and the DRAM 614 operates as a work memory to store programs to be executed by the CPU 611 or data being processed. More specifically, in one example, the DRAM 614 stores image data being processed by the image processor 604 and processed data of an equirectangular projection image.

The operation device 615 collectively refers to various operation buttons such as the image-capturing start button. The user operates the operation device 615 to start capturing and recording an image, turn on or off the power to the meeting device 60, establish a connection, perform communication, and input settings such as various image-capturing modes and image-capturing conditions.

The external device connection I/F 616 is an interface for connecting the meeting device 60 to various external devices. The external devices include, for example, but are not limited to, a PC, a display, a projector, and an electronic whiteboard. The external device connection I/F 616 may include, for example, a USB terminal and a High-Definition Multimedia Interface (HDMI®) terminal. The moving image data or image data stored in the DRAM 614 is transmitted to an external terminal or recorded in an external medium via the external device connection I/F 616. In one embodiment, the meeting device 60 includes a plurality of external device connection I/Fs 616. For example, the meeting device 60 uses the plurality of external device connection I/Fs 616 to transmit image information of an image captured and acquired by the meeting device 60 to a PC via USB to record the image information in the PC. Concurrently, the meeting device 60 may acquire video (e.g., screen information to be displayed by the teleconferencing application 42) from the PC and transmit the video to another external device (such as a display, a projector, or an electronic whiteboard) via HDMI® to display the video.

The communication device 617 may communicate with a cloud server via the Internet by a wireless communication technology such as Wi-Fix through the antenna 617*a* provided in the meeting device 60 and transmit the stored moving image data or image data to the cloud server. The communication device 617 may communicate with a nearby device using a short-range wireless communication technology such as Bluetooth Low Energy (BLER) or Near Field Communication (NFC).

The sound sensor 618 is a sensor that acquires 360-degree audio information to identify the direction from which a loud sound is input in a 360-degree area around the meeting device 60 (on a horizontal plane). The audio processor 609 determines the direction in which the volume of the sound is the highest, based on an input 360-degree audio parameter, and outputs the direction from which the sound is input in the 360-degree area.

Another sensor (such as an azimuth/acceleration sensor or a Global Positioning System (GPS) sensor) may calculate an azimuth, a position, an angle, an acceleration, or the like and use the calculated azimuth, position, angle, acceleration, or the like to correct an image or add position information.

The image processor 604 further performs the following processes.

The CPU 611 creates a panoramic image according to a method below. The CPU 611 performs predetermined camera video processing such as Bayer conversion (RGB interpolation processing) on raw data input from an image sensor that receives input of spherical video, and generates fisheye video. The fisheye video is video including curved-surface images. The CPU 611 further performs flattening processing such as dewarping processing (distortion correction processing) on the generated fisheye video (curved-surface video) to create a panoramic image (video including flat-surface images) of the 360-degree surroundings of the meeting device 60.

The CPU 611 creates a talker image according to a method below. The CPU 611 clips a portion including a talker from the panoramic image (video including flat-surface images) of the 360-degree surroundings to create a talker image. The CPU 611 determines, as the direction of the talker, the sound input direction output using the sound sensor 618 and the audio processor 609 and identified from the 360-degree area, and clips the talker image from the panoramic image. At this time, the method of clipping an image of a person based on the sound input direction clips a 30-degree portion around a sound source direction identified from the 360-degree area, and performs face detection on the 30-degree portion to clip an image of a person. The CPU 611 identifies, among talker images that have further been clipped, talker images of a specific number of persons (e.g., three persons) who have most recently made utterances.

In one example, the panoramic image and the one or more talker images are separately transmitted to the information recording application 41. In another example, the meeting device 60 generates one image from the panoramic image and the one or more talker images and transmits the one image to the information recording application 41. In the present embodiment, the panoramic image and the one or more talker images are separately transmitted from the meeting device 60 to the information recording application 41.

FIGS. 5A and 5B are views of the meeting device 60, illustrating an image capturing range of the meeting device 60. As illustrated in FIG. 5A, the meeting device 60 captures an image of a 360-degree area in the horizontal direction. As illustrated in FIG. 5B, the meeting device 60 has an image capturing range of predetermined angles above and below an axis horizontal to the height of the meeting device 60, where the axis is defined as 0 degrees.

Figure 6:
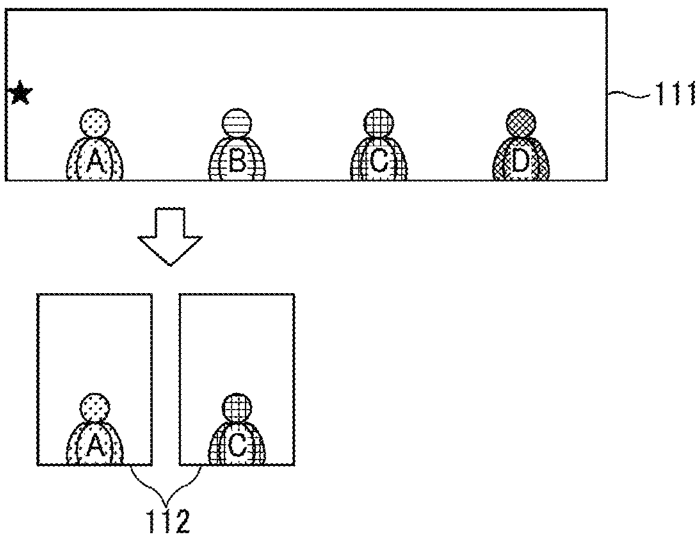
FIG. 6 is an illustration of a panoramic image and talker images clipped from the panoramic image according to one embodiment of the present disclosure.

FIG. 6 is an illustration of a panoramic image and talker images clipped from the panoramic image. As illustrated in FIG. 5B, the meeting device 60 divides the angle of view into ranges having a predetermined angle in the vertical direction and a predetermined angle in the horizontal direction and performs perspective projection transformation on each of the divided ranges. The perspective projection transformation is applied thoroughly to the entire 360-degree area in the horizontal direction to obtain a predetermined number of flat images. The predetermined number of flat images are stitched together side by side to form a panoramic image 111. Further, the meeting device 60 performs face detection in a predetermined range centered around a sound source direction in the panoramic image 111, and clips an image of 15 degrees each leftward and rightward (30 degrees in total) from the center of the face of each person to create a talker image 112.

Functions

A functional configuration of the information record display system 100 will be described with reference to FIG. 7. FIG. 7 is a block diagram illustrating, in blocks, functions of the terminal apparatus 10, the meeting device 60, and the information processing system 50 of the information record display system 100.

Terminal Apparatus

The information recording application 41 operating on the terminal apparatus 10 includes a communication unit 11, an operation reception unit 12, a display control unit 13, an application screen acquisition unit 14, an audio acquisition unit 15, a device communication unit 16, a moving image storing unit 17, an audio data processing unit 18, a video record display unit 19, an upload unit 20, an editing processing unit 21, and a search unit 22. Each of these units of the terminal apparatus 10 is implemented by or caused to function by one or more of the components illustrated in FIG. 3 operating in accordance with instructions from the CPU 501 according to the information recording application 41 loaded onto the RAM 503 from the HD 504. The terminal apparatus 10 also includes a storage unit 1000, which is implemented by, for example, the HD 504 illustrated in FIG. 3. The storage unit 1000 includes an information storage unit 1001.

The communication unit 11 communicates with the information processing system 50 to transmit and receive various types of information to and from the information processing system 50 via a network.

For example, the communication unit 11 receives a list of teleconferences from the information processing system 50, and transmits an audio data recognition request to the information processing system 50.

The display control unit 13 displays various screens serving as user interfaces in the information recording application 41, in accordance with screen transitions set in the information recording application 41. The operation reception unit 12 receives various operations performed on the information recording application 41.

The application screen acquisition unit 14 acquires, for example, screen information to be displayed by an application selected by the user or screen information of a desktop screen from an operating system (OS) or the like. When the application selected by the user is the teleconferencing application 42, the application screen acquisition unit 14 acquires a screen generated by the teleconferencing application 42. In one example, the screen generated by the teleconferencing application 42 includes a captured image obtained by a camera of a terminal apparatus at each site capturing an image of a user of the terminal apparatus, a display image of a document that is being shared, and an image including participant icons, participant names, and the like. The screen information (application screen) displayed by the application is information displayed as a window by one or more currently operating applications (including the teleconferencing application 42) and acquired as an image by the information recording application 41. The window of the application is displayed on a monitor or the like such that the area of the window is rendered as an area in the entire desktop image. The screen information displayed by the application is acquirable by another application (such as the information recording application 41) as an image file or a recorded video file including a plurality of consecutive images via, for example, an application programming interface (API) of the OS or an API of the application that displays the screen information. The screen information of the desktop screen is information including an image of the desktop screen generated by the OS, and is also acquirable as an image file or a recorded video file via an API of the OS. The format of these image files may be, for example, bitmap, Portable Network Graphics (PNG), or any other format. The format of the recorded video files may be, for example, MP4 or any other format.

The audio acquisition unit 15 acquires audio (including audio data received from the teleconferencing application 42 during the teleconference) output from a microphone or an earphone of the terminal apparatus 10. Even in a state where the output audio is muted, the audio acquisition unit 15 can acquire the audio. The audio acquisition unit 15 can acquire audio that can be output from the terminal apparatus 10, via an API of the OS or an API of the application, without any user operation such as selection of the teleconferencing application 42 for audio data. Accordingly, the audio data received by the teleconferencing application 42 from the other site 101 is also acquired. When the teleconferencing application 42 is not operating or the teleconference is not ongoing, the information recording application 41 may fail to acquire the audio data. The audio acquired by the audio acquisition unit 15 may be audio data to be output from the terminal apparatus 10, without including the audio collected by the terminal apparatus 10. This is because the meeting device 60 separately collects audio in the site 102.

The device communication unit 16 communicates with the meeting device 60 via a USB cable, for example. The device communication unit 16 may communicate with the meeting device 60 via, for example, a wireless local area network (LAN) or Bluetooth®. The device communication unit 16 receives the panoramic image and the talker images from the meeting device 60, and transmits the audio data acquired by the audio acquisition unit 15 to the meeting device 60. The device communication unit 16 receives combined audio data obtained by the meeting device 60.

The moving image storing unit 17 stores, as individual video records (videos), the panoramic image and the talker images received by the device communication unit 16 and an application screen acquired by the application screen acquisition unit 14. The moving image storing unit 17 further stores the combined audio data. The moving image storing unit 17 may combine the audio data with the panoramic image to generate a panoramic image with accompanying audio.

The audio data processing unit 18 requests the information processing system 50 to convert the combined audio data received from the meeting device 60 into text data.

The video record display unit 19 displays (plays) a video record. The video record is stored in the terminal apparatus 10 during recording and then uploaded to the information processing system 50.

After the teleconference ends, the upload unit 20 transmits the video record and the audio data to the information processing system 50.

The editing processing unit 21 edits the video record in accordance with a user operation. For example, the editing processing unit 21 deletes a portion of the video record or splices portions of the video record.

The search unit 22 searches for text data using a keyword input by the user. A portion of the text data found as a result of the search also identifies the time at which the text corresponding to the portion is uttered after the start of the conference.

FIG. 8 illustrates moving image recording information stored in the information storage unit 1001. The moving image recording information includes items such as "conference ID", "recorded video ID", "update date and time", "title", "upload", and "storage destination". When the user logs into the information processing system 50, the information recording application 41 is allowed to download the conference information acquired by the information processing system 50 from the conference management system 9 and application-side conference information stored in the information processing system 50. The moving image recording information reflects data such as the conference ID included in the conference information. The moving image recording information illustrated in FIG. 8 is stored in the terminal apparatus 10 operated by a certain user.

The item "conference ID" indicates identification information for identifying a teleconference that is held. In one example, the conference ID is assigned when a schedule of the teleconference is registered to the conference management system 9. In another example, the conference ID is assigned by the information processing system 50 in response to a request from the information recording application 41. The conference management system 9 is a system for registering various types of information such as a schedule of a conference, a schedule of a teleconference, a Uniform Resource Locator (URL) (conference link) for starting the teleconference, and reservation information of a device to be used in the conference. Examples of the conference management system 9 include a scheduler connectable from the terminal apparatus 10 via a network. The conference management system 9 is configured to transmit the registered schedule and the like to the information processing system 50.

The item "recorded video ID" indicates identification information for identifying a video record that is recorded in the teleconference. In one example, the recorded video ID is assigned by the meeting device 60. In another example, the recorded video ID may be assigned by the information recording application 41 or the information processing system 50. Different recorded video IDs are assigned for the same conference ID in a case where the recording is terminated, but is resumed for some reason during the teleconference.

The item "update date and time" indicates the date and time when the video record is updated (or the recording ends). When the video record is edited, the update date and time is the date and time of editing.

The item "title" indicates a name of a conference. In one example, the title is set when the conference is registered to the conference management system 9. In another example, the title may be set by the user as desired.

The item "upload" indicates whether the video record has been uploaded to the information processing system 50.

The item "storage destination" indicates a location (a URL or a file path) where the video record and text data are stored in the storage service system 70. Accordingly, the video record uploaded to the information processing system 50 is accessible to the user as desired. The panoramic image, the talker images, the screen of the application, and the text data are stored with different file names after the URL, for example.

Meeting Device

Referring back to FIG. 7, the meeting device 60 will be described. The meeting device 60 includes a terminal communication unit 61, a panoramic image creation unit 62, a talker image creation unit 63, an audio collection unit 64, and an audio combining unit 65. Each of these units of the meeting device 60 is implemented by or caused to function by one or more of the components illustrated in FIG. 4 operating in accordance with instructions from the CPU 611 according to a program loaded onto the DRAM 614 from the ROM 612.

The terminal communication unit 61 communicates with the terminal apparatus 10 via, for example, a USB cable. The terminal communication unit 61 may communicate with the terminal apparatus 10 via, for example, a wireless LAN or Bluetooth.

The panoramic image creation unit 62 creates a panoramic image. The talker image creation unit 63 creates a talker image. The method for creating a panoramic image and a talker image has been described with reference to FIGS. 5A, 5B, and 6.

The audio collection unit 64 converts an audio signal acquired by the microphone 608 of the meeting device 60 into (digital) audio data. Accordingly, the audio of speech uttered by the user 107 or the participants at the site 102 where the terminal apparatus 10 is located is collected.

The audio combining unit 65 combines the audio transmitted from the terminal apparatus 10 at the other site 101 and the audio collected by the audio collection unit 64. Accordingly, the audio of speech uttered at the other site 101 and the audio of speech uttered at the site 102 are combined.

Information Processing System

The information processing system 50 includes a communication unit 51, an authentication unit 52, a screen generation unit 53, a conference information acquisition unit 54, and a text conversion unit 55. Each of these units of the information processing system 50 is implemented by or caused to function by one or more of the components illustrated in FIG. 3 operating in accordance with instructions from the CPU 501 according to a program loaded onto the RAM 503 from the HD 504. The information processing system 50 also includes a storage unit 5000, which is implemented by, for example, the HD 504 illustrated in FIG. 3. The storage unit 5000 includes an application-side conference information storage unit 5001 and a recorded video information storage unit 5002.

The communication unit 51 transmits and receives various types of information to and from the terminal apparatus 10. For example, the communication unit 51 transmits a list of teleconferences to the terminal apparatus 10, and receives an audio data recognition request from the terminal apparatus 10.

The authentication unit 52 authenticates a user who operates the terminal apparatus 10. The authentication unit 52 authenticates the user by, for example, determining whether authentication information (a user ID and a password) included in an authentication request received by the communication unit 51 matches authentication information stored in advance. The authentication information may be, for example, a card number of an integrated circuit (IC) card or biometric authentication information such as a face or a fingerprint. The authentication unit 52 may use an external authentication system or an authentication method such as Open Authorization (OAuth) to perform authentication.

The screen generation unit 53 generates screen information to be displayed by the terminal apparatus 10. When the terminal apparatus 10 executes a native application, the screen information is stored in the terminal apparatus 10, and the information to be displayed is transmitted in a form such as Extensible Markup Language (XML). When the terminal apparatus 10 executes a web application, the screen information is created by Hypertext Markup Language (HTML), XML, Cascade Style Sheet (CSS), JavaScript®, or the like.

The conference information acquisition unit 54 acquires the conference information from the conference management system 9 using an account of each user or a system account assigned to the information processing system 50. In one embodiment, the conference information acquisition unit 54 acquires a list of teleconferences that a user belonging to the tenant has a right to view.

The information recording application 41 of the terminal apparatus 10 may grant a right to view the conference information managed by the conference information acquisition unit 54. Teleconference information that a user belonging to the tenant has a right to view includes conference information created by the user and conference information that the user is granted a right to view by another user. Since each teleconference is assigned a conference ID, the conference ID is used to associate the teleconference with an information record.

The text conversion unit 55 uses an external speech recognition service to convert, into text data, audio data requested to be converted into text data by the terminal apparatus 10. In another example, the text conversion unit 55 performs this conversion.

FIG. 9 illustrates an example of the application-side conference information stored in the application-side conference information storage unit 5001. The application-side conference information is created separately from the conference information, when the information recording application 41 creates an information record, and is stored in the information recording application 41.

The item "conference ID" indicates identification information of a conference. The conference ID associates the conference information managed by the conference management system 9 with the application-side conference information.

The item "application ID" indicates identification information of the information recording application 41.

The item "user ID of access token recipient" indicates identification information of a user who receives an access token issued by the storage service system 70.

The item "URL of access token issuer" indicates the URL of the storage service system 70 from which the access token is issued.

The item "issuance date and time" indicates a date and time when the access token is issued. The issuance date and time is determined at the time of issuance.

The item "effective date and time" indicates a date and time when the access token becomes effective. The effective date and time is determined by the issuer.

The item "expiration date" indicates the expiration date of the access token. The expiration date is determined by the issuer.

The item "permission information" indicates permissions given to the user by the access token to perform processing. The permission information is determined by the issuer.

The item "display name" indicates a display name of the user in the information recording application 41.

The item "first name" indicates the first name of the user.

The item "last name" indicates the last name of the user.

FIG. 10 illustrates recorded video information stored in the recorded video information storage unit 5002. The recorded video information includes a list of video records recorded by all the users belonging to the tenant. The recorded video information includes items such as "conference ID", "recorded video ID", "update date and time", "title", "upload", and "storage destination". These items may be the same as those in FIG. 8. The storage destination (path information such as a URL of a cloud storage system) may be set by the user inputting desired storage destination information on, for example, a user setting screen of the information recording application 41 of the terminal apparatus 10, and may be stored in the recorded video information storage unit 5002.

Conference Management System

Referring back to FIG. 7, the conference management system 9 will be described. The conference management system 9 includes a conference information management unit 31. The conference information management unit 31 of the conference management system 9 is implemented by or caused to function by one or more of the components illustrated in FIG. 3 operating in accordance with instructions from the CPU 501 according to a program loaded onto the RAM 503 from the HD 504. The conference management system 9 also includes a storage unit 3000, which is implemented by, for example, the HD 504 illustrated in FIG. 3. The storage unit 3000 includes a conference information storage unit 3001.

The conference information management unit 31 manages conference information of conferences to be held in the tenant. The conference information is stored in the conference information storage unit 3001.

FIG. 11 illustrates an example of the conference information stored in the conference information storage unit 3001. The conference information is managed by a conference ID and includes items presented in FIG. 11.

The item "conference ID" indicates identification information of a conference.

The item "tenant ID" indicates the identification information of a tenant in which the conference is to be held.

The item "title" indicates a theme or subject of the conference.

The item "host" indicates a host of the conference.

The item "participant" indicates a list of participants invited to the conference.

The item "accessible user" indicates a list of users authorized to access conference resources including the video record.

The item "ad-hoc participant" indicates a list of guest participants.

The item "location" indicates information related to a conference room, such as the name of the conference room.

The item "start time" indicates a scheduled time at which the conference is expected to start.

The item "end time" indicates a scheduled time at which the conference is expected to end.

The item "conference creator" indicates an ID of a user who has registered the conference information.

The item "password" indicates a password for the participants to log into the conference.

Storage Service System

The storage service system 70 is any service system that stores information. A description will be given of a data structure of text data stored in the storage service system 70.

FIG. 12 is a diagram illustrating a structure of text data stored in the storage service system 70. As illustrated in FIG. 12, in the text data, the items "ID", "time", "user", and "text" are associated with each other, for example, in a database in a table format. The item "ID" indicates identification information assigned when the text data is divided into units of "text", that is, multiple speeches (character strings), according to a predetermined rule. The predetermined rule is set in the speech recognition service system 80. For example, the rule specifies dividing the text data when a silence continues for a certain period of time, dividing the text data after a lapse of a certain period of time regardless of the presence of silence, or dividing the text data into units of sentences detected by morphological analysis. The item "time" indicates an utterance time expressed as the elapsed time from the start of recording to the time when an utterance is made. Since the so-called time of day is also stored at the start of recording, the time (absolute time) at which each text, namely, each character string, is uttered is also identified. The item "user" indicates a site at which each utterance is made, namely, the site where the meeting device 60 is located or another site. The site is determined based on, for example, a sound pressure level. The item "text" indicates one or more character strings that are part of the divided text data.

As described above, the item "time" is associated with the item "text". Accordingly, when the text data includes one or more character strings that are found as a result of a search, the information recording application 41 displays the video record from the display time indicated by the item "time".

Method for Creating Omnidirectional Panoramic Image

Next, a description will be given of a method for creating an omnidirectional panoramic image that covers approximately 360 degrees at least in the horizontal direction (hereinafter simply referred to as a "panoramic image") and the reason for the use of an upper hood provided for the meeting device 60. The term "approximately 360 degrees" is not restricted to exactly 360 degrees, but refers to a range of angles within which the entire horizontal area can be determined to appear in the panoramic image. In one example, the term "approximately 360 degrees" refers to a range of approximately 350 degrees to 360 degrees.

Figure 13:
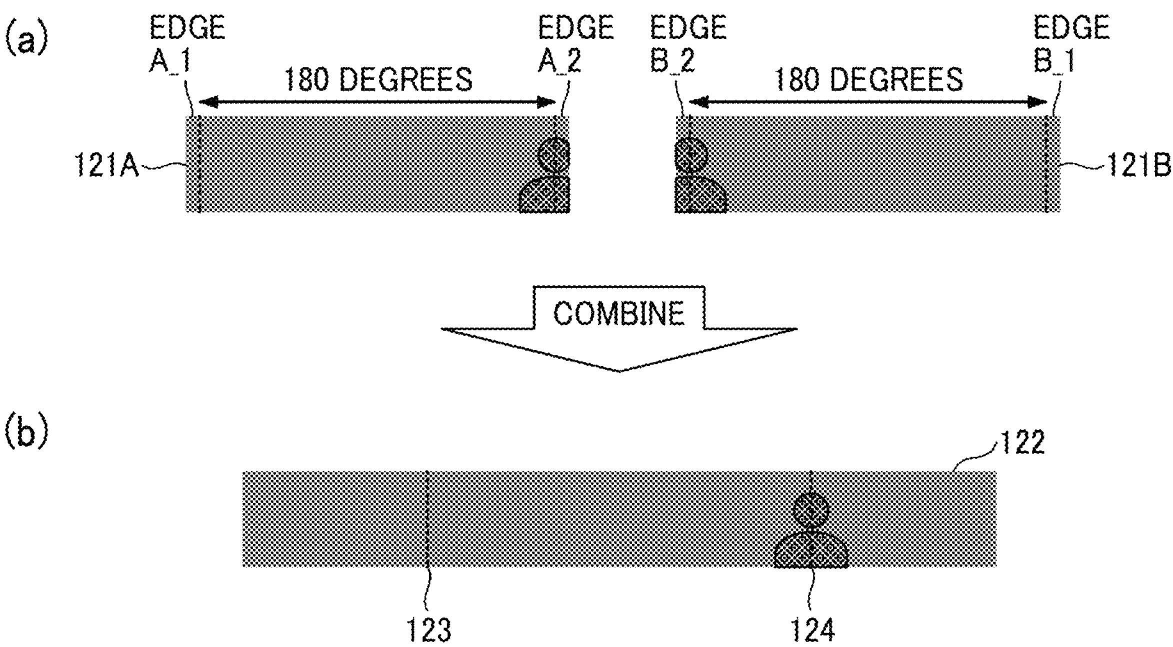
FIG. 13 is an illustration of camera images and a panoramic image according to one embodiment of the present disclosure.

First, a method for creating a panoramic image 122 from camera images 121A and 121B will be described with reference to FIG. 13. FIG. 13(*a*) illustrates the camera images 121A and 121B. FIG. 13(*b*) illustrates the panoramic image 122. Each of the camera images 121A and 121B has an angle of view greater than 180 degrees in the horizontal direction. In one embodiment, the panoramic image creation unit 62 generates the panoramic image 122 by, for example, stitching together a portion near an edge A_1 of the camera image 121A and a portion near an edge B_1 of the camera image 121B along a seam 123 and stitching together a portion near an edge A_2 of the camera image 121A and a portion near an edge B_2 of the camera image 121B along a seam 124. When combining the camera images 121A and 121B, the panoramic image creation unit 62 performs pattern matching on an area near the edge B_1 using an image portion near the edge A_1 (or vice versa) and performs pattern matching on an area near the edge B_2 using an image portion near the edge A_2 (or vice versa) to determine stitching portions of the two camera images 121A and 121B having highest similarity between the image portions of the areas. The stitching portions are stitched together to make portions having an angle of view greater than 180 degrees overlap. As a result, the panoramic image 122 that covers 360 degrees in the horizontal direction is generated.

In one example, the edge A_1 and the edge B_1 are stitched together to form the seam 123, and the edge A_2 and the edge B_2 are stitched together to form the seam 124. Without the influence of flare or ghosting described below, the seams 123 and 124 are not noticeable.

Influence of Flare

Figure 14:
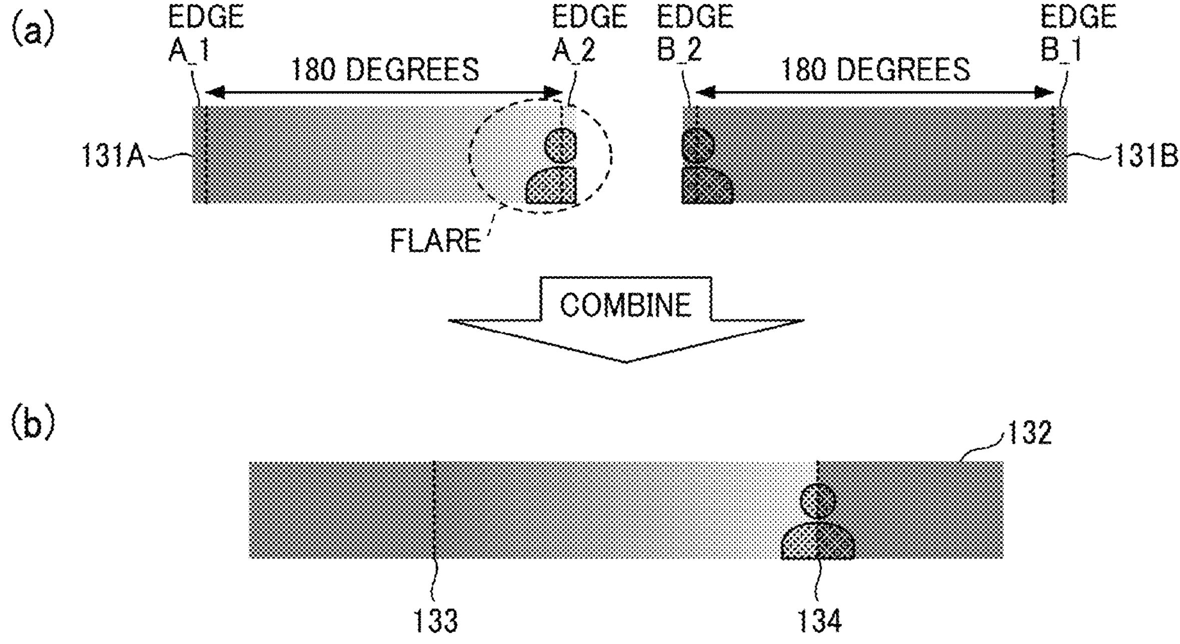
FIG. 14 is an illustration of how lighting by a ceiling light in a conference room affects seams of two camera images according to one embodiment of the present disclosure.

A case where a camera image 131A or a camera image 131B is affected by flare will be described with reference to FIG. 14. FIG. 14 is an illustration of how lighting by a ceiling light in a conference room affects seams 133 and 134 of the camera images 131A and 131B. FIG. 14(*a*) illustrates an example in which the camera image 131A captured by the meeting device 60 has flare. Flare is a phenomenon that occurs when strong light is incident on a lens. The strong light incident on the lens is reflected in the lens, resulting in fog (unintended light exposure to an imaging element causes certain areas of a resulting image to become dark) or unevenness in brightness. In a case where a ceiling light that emits bright light is installed near the ceiling above the meeting device 60, direct light from the ceiling light is incident on lenses 602A and 602B (e.g., FIG. 16) of the meeting device 60 and is reflected in the lenses 602A and 602B, resulting in the occurrence of a phenomenon called flare.

FIG. 14(*b*) illustrates a panoramic image 132 when, as illustrated in FIG. 14(*a*), the camera image 131A has flare near the edge A_2. Since the camera image 131A has flare near the edge A_2, the flare causes color discontinuities at a seam 134 where a portion near the edge A_2 of the camera image 131A and a portion near the edge B_2 of the camera image 131B are stitched together in the panoramic image 132. Such color discontinuities make the user viewing the panoramic image 132 feel uncomfortable.

The camera images 131A and 131B may have flare at edges thereof, and the entire camera images 131A and 131B may also have flare. In a case where the entire camera images 131A and 131B have flare, the flare causes color discontinuities at both the seams 133 and 134 of the panoramic image 132 and makes the seams 133 and 134 unsmooth in the panoramic image 132.

Flare may also be caused by a table lamp as well as a ceiling light. In a case where the meeting device 60 is installed outdoors or near a window, flare may be caused by, for example, outdoor sunlight.

Influence of Ghosting

Figure 15:
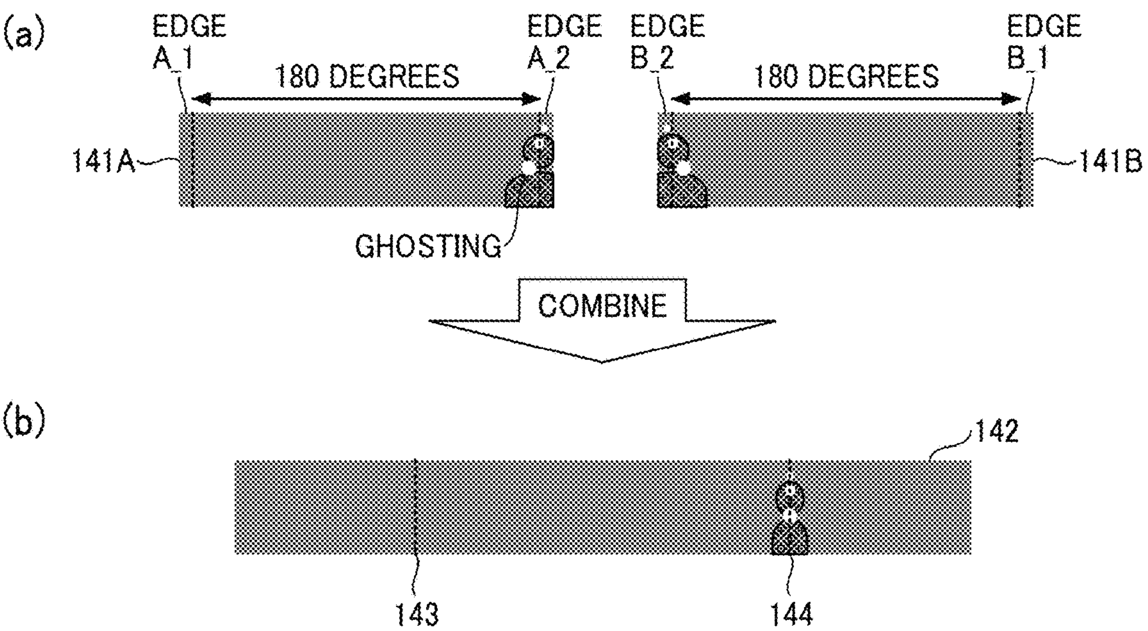
FIG. 15 is an illustration of how ghosting caused by lighting by a ceiling light in a conference room affects seams of two camera images according to one embodiment of the present disclosure.

An influence of ghosting caused in a camera image 141A and a camera image 141B will be described with reference to FIG. 15. FIG. 15 is an illustration of how ghosting caused by lighting by a ceiling light in a conference room affects seams 143 and 144 of the camera images 141A and 141B. Ghosting refers to a phenomenon in which strong light incident on a lens is reflected in the lens, and the reflected light creates spots or streaks in an image focused on an imaging element. In a case where a ceiling light that emits bright light is installed near immediately above the meeting device 60, direct light from the ceiling light is incident on the lenses 602A and 602B (e.g., FIG. 16) of the meeting device 60, and a ghost image may be generated.

In FIG. 15(*a*), as an example, the camera image 141A has ghosting near the edge A_2, and the camera image 141B has ghosting near the edge B_2. To combine the camera images 141A and 141B, the panoramic image creation unit 62 performs pattern matching on a portion near the edge A_2 of the camera image 141A and a portion near the edge B_2 of the camera image 141B. In a case where such pattern matching is performed, combination processing tends to be performed such that generated ghostly patterns are matched to each other. Accordingly, as illustrated in FIG. 15(*b*), the portion near the edge A_2 of the camera image 141A and the portion near the edge B_2 of the camera image 141B are stitched together at positions different from optimum positions at which these portions would be stitched together without ghosting. As a result, the camera images 141A and 141B may shift at the seam 144, and such a shift makes the user viewing a panoramic image 142 feel uncomfortable. A similar issue may also arise for flare.

Detailed Structure of Meeting Device

In the present embodiment, an upper hood is attached to the meeting device 60 to prevent or reduce flare or ghosting. A structure of the meeting device 60 will be described in detail with reference to FIGS. 16 to 25B.

Figure 16:
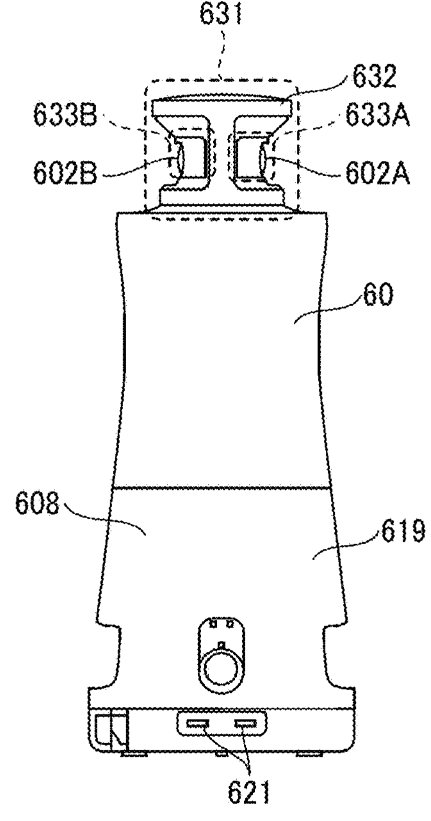
FIG. 16 is a side view of the meeting device according to one embodiment of the present disclosure.

FIG. 16 is a side view of the meeting device 60. The meeting device 60 includes imaging units 633A and 633B having optical axes oriented in opposite directions. The imaging units 633A and 633B include the lenses 602A and 602B, respectively. Each of the lenses 602A and 602B has an angle of view greater than 180 degrees in the horizontal direction. As described with reference to FIG. 13, images from the lenses 602A and 602B are projected onto the imaging elements 603*a* and 603*b* (described with reference to FIG. 4) to acquire the camera images 121A and 121B, respectively. The camera images 121A and 121B are combined at the seams 123 and 124 by image processing to produce a panoramic image that covers 360 degrees in the horizontal direction.

The meeting device 60 according to the present embodiment has the following features. The meeting device 60 includes an upper hood 632 above the two imaging units 633A and 633B. An acute angle (hereinafter referred to as an "incident angle") 0 formed by each of the optical axes (horizontal line) of the imaging units 633A and 633B and a straight line connecting an upper hood protrusion (described below) corresponding to the end of the upper hood 632, as viewed from the lenses 602A and 602B, and a corresponding one of the vertices of the lenses 602A and 602B is greater than or equal to 30 degrees and less than or equal to 67 degrees. The incident angle θ in a lens end direction is smaller than that in a lens front direction (optical axis direction). In other words, one of the features of the meeting device 60 is that the upper hood 632 provided above the two imaging units 633A and 633B appropriately restricts the incidence of direct light from the ceiling light on the lenses 602A and 602B.

Although described in detail hereinafter, the structure and function of the meeting device 60 are not limited to those in the following embodiment.

The meeting device 60 includes an omnidirectional camera unit 631 that captures an omnidirectional image covering 360 degrees at least in the horizontal direction. The omnidirectional camera unit 631 includes the imaging units 633A and 633B and the lenses 602A and 602B. The omnidirectional camera unit 631 is provided in a top portion of the meeting device 60 and includes the imaging units 633A and 633B having optical axes oriented in opposite directions. The optical axes are assumed to be oriented in any horizontal directions.

The imaging units 633A and 633B include the lenses 602A and 602B, each of which is a super-wide-angle lens having an angle of view greater than 180 degrees, respectively. The imaging elements 603*a* and 603*b* described above are provided in the imaging units 633A and 633B, respectively. The omnidirectional camera unit 631 may have a mechanism for rotating in the horizontal direction with respect to the meeting device 60.

In the meeting device 60, the upper hood 632 is provided above the imaging units 633A and 633B. The upper hood 632 is provided in a top portion on the upper side of the meeting device 60 in the vertical direction and is located at a position so as to shield light incident on the lenses 602A and 602B from directly above (a position so as to cover the lenses 602A and 602B). The imaging units 633A and 633B project the images from the lenses 602A and 602B onto the imaging elements 603*a* and 603*b* to acquire the camera images 121A and 121B, respectively. The meeting device 60 combines the camera images 121A and 121B at the seams 123 and 124 by image processing to generate a panoramic image that covers 360 degrees in the horizontal direction.

The meeting device 60 further includes a plurality of external device connection I/Fs 616 for connecting an external device or a power source to the meeting device 60. The external device connection I/Fs 616 allow the meeting device 60 to receive power supplied from an external power source such as an alternating current (AC) adapter.

The external device connection I/Fs 616 further allow the meeting device 60 to be connected to an external device such as a computer via a connection cable such as a USB cable to transmit and receive data to and from the external device. The meeting device 60 further includes the speaker 619 and the microphone 608 in a main body of the meeting device 60.

The microphone 608 allows the meeting device 60 to transmit, in a teleconference, audio as well as video at the site where the meeting device 60 is installed to multiple sites. The speaker 619 incorporated in a side portion of the main body allows the meeting device 60 to play, at the site, audio from other sites in real time.

Configuration of Upper Hood and Effect Thereof

Figure 17:
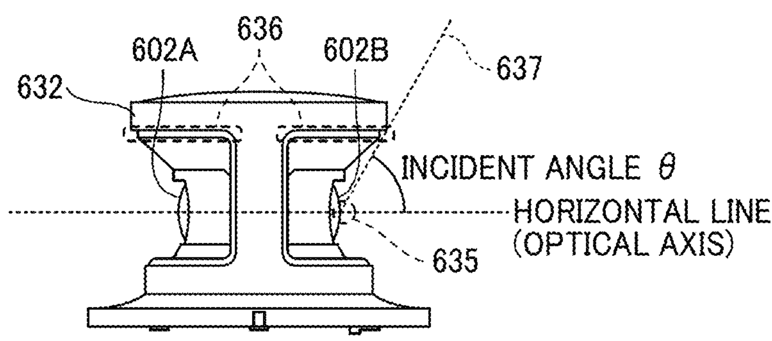
FIG. 17 is a view of an upper hood according to one embodiment of the present disclosure.
Figure 18:
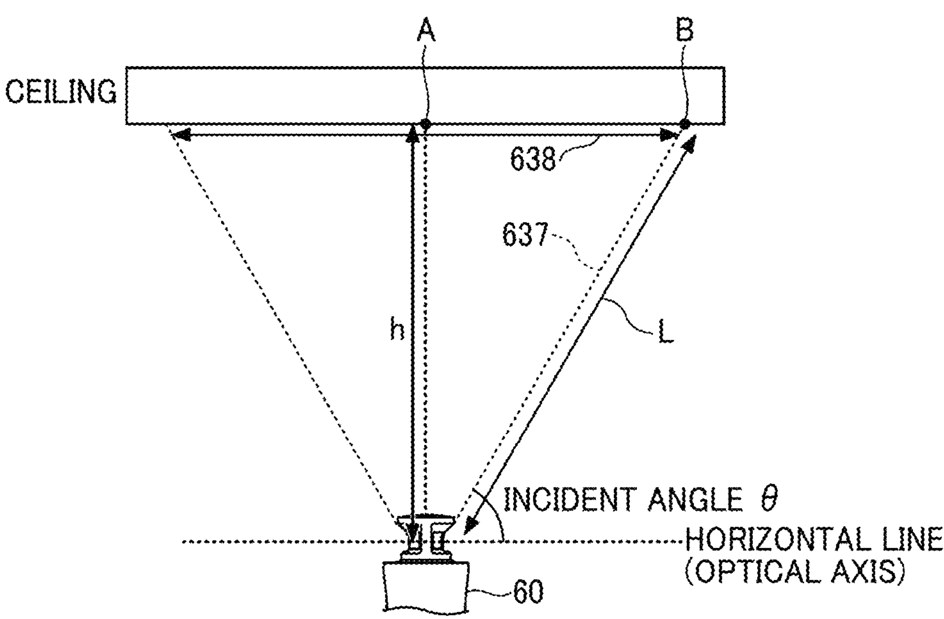
FIG. 18 is a view of the meeting device, illustrating an incident angle of light from the ceiling light onto lenses of the meeting device according to one embodiment of the present disclosure.

FIG. 17 illustrates a configuration of the upper hood 632. FIG. 18 illustrates an incident angle of light from the ceiling light onto the lenses 602A and 602B. In one embodiment, the meeting device 60 includes the upper hood 632 to reduce the incidence of direct light from a ceiling light of a conference room on the lenses 602A and 602B. Thus, the meeting device 60 provides the user with a visually comfortable panoramic image with reduced adverse influences on the seams of the panoramic image.

A maximum angle at which light from the ceiling light can be incident on a lens vertex 635 of each of the lenses 602A and 602B is the incident angle θ. Light incident at the incident angle θ comes into contact with the upper hood 632 at a portion referred to as an upper hood protrusion 636. A straight line connecting the lens vertex 635 and the upper hood protrusion 636 is referred to as a "shielding line 637". A region surrounded by the shielding line 637 is referred to as a "non-light incidence region 638". Light from the ceiling light in the non-light incidence region 638 is not incident on the lenses 602A and 602B. Thus, the meeting device 60 provides the user with a visually comfortable panoramic image with reduced adverse influences on the seams of the panoramic image.

As the incident angle θ, which is the angle formed by the shielding line 637 and the optical axis, decreases, light from the ceiling light is less likely to directly enter the lenses 602A and 602B, and the size of the non-light incidence region 638 increases. In addition, the shortest distance from the lens vertex 635 to the ceiling light, namely, an extension of the shielding line 637 to the ceiling, increases. The shortest distance is hereinafter referred to as a "possible light incidence distance L". The possible light incidence distance L is the shortest distance in which light from the ceiling light can be directly incident on the lenses 602A and 602B. The intensity of light attenuates in inverse proportion to the square of the distance. Thus, even if light from a ceiling light of an office is directly incident on the lenses 602A and 602B, the incident angle θ is reduced and the possible light incidence distance L is increased to reduce the adverse effects on the seams of the panoramic image.

Figure 19:
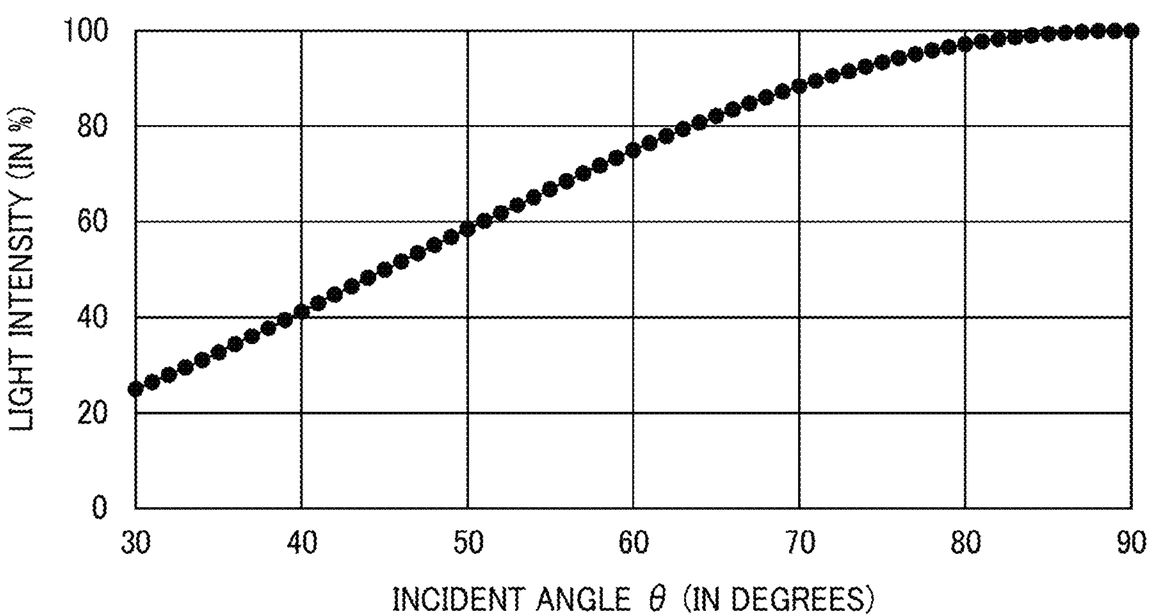
FIG. 19 is a graph illustrating a relationship between the incident angle and light intensity in a typical conference room according to one embodiment of the present disclosure.

FIG. 19 is a graph illustrating a relationship between the incident angle θ and light intensity in a typical conference room. As illustrated in FIG. 19, as the incident angle θ increases, the intensity of light incident on the lenses 602A and 602B also increases. The light intensity is also a light residual ratio representing the measure of light attenuation.

The description is continued with reference to FIG. 18. For example, the distance from the lens vertex 635 of the omnidirectional camera unit 631 to the ceiling in a direction directly above the lens vertex 635 is represented by h. A perpendicular line drawn from the lens vertex 635 to the ceiling intersects the ceiling at a position A, and the shielding line 637 intersects the ceiling at a position B. The distance from the lens vertex 635 to the position B corresponds to the possible light incidence distance L, and the possible light incidence distance L is given by h/SINΘ. The value h may be set to an approximate value based on the height of a typical office ceiling or the height of a typical office desk, or may be set to an actual measurement value.

In one example, ceiling lights having the same brightness are installed at the positions A and B. Since light attenuates in inverse proportion to the square of the distance, the ratio of the intensity of light directly incident on the lens 602A or 602B from the ceiling light installed at the position B to the intensity of light directly incident on the corresponding lens 602A or 602B from the ceiling light installed at the position A, namely, the light attenuation ratio, is calculated by Equation (1).

$$\text{Light attentuation ratio [\%]} = \frac{1}{\left(\frac{L}{h}\right)^2} \times 100 = \sin^2\theta \quad (1)$$

In a case where a ceiling light is installed at the position A, the distance between the omnidirectional camera unit 631 and the ceiling light installed on the ceiling at the position A is shortest. Thus, light from the ceiling light would be most likely to cause adverse influences such as flare and ghosting without the use of the upper hood 632 serving as a light shield.

As indicated in Equation (1), the intensity of light directly incident on the lenses 602A and 602B from the ceiling light decreases as the incident angle θ decreases. Accordingly, the intensity of light incident from the ceiling light installed at the position B is reduced compared with the intensity of light incident from the ceiling light installed at the position A. In terms of the brightness of illumination in a typical conference room in an office, it is considered that flare and ghosting will be prevented or reduced if the intensity of light incident on the lenses 602A and 602B is reduced to be less than or equal to 85% of that from the ceiling light at the position A from which the light is most strongly incident on the lenses 602A and 602B. That is, by reducing the intensity of light from the ceiling light at the position B to 85% or less of that from the ceiling light at the position A, the meeting device 60 reduces the adverse effects on the seams of the panoramic image. Equation (1) or FIG. 18 indicates that the light intensity is reduced to 85% or less by setting the incident angle θ to 67 degrees or less, thereby reducing adverse effects.

On the other hand, the angle of view with which an image of a person in a conference is captured is preferably greater than or equal to 30 degrees above the horizontal line, and the incident angle θ is also preferably greater than or equal to 30 degrees. Accordingly, setting the incident angle θ to approximately 30 degrees to approximately 67 degrees makes it possible to reduce the influence of the ceiling light on the seams of the panoramic image (reduction in image quality) while securing the desired angle of view to capture an image of a person. The term "approximately 30 degrees to approximately 67 degrees" does not mean exactly 30 degrees to exactly 67 degrees, but refers to approximately an angle in the range of approximately 30 degrees to approximately 67 degrees.

Amount of Protrusion of Upper Hood

Figure 20A:
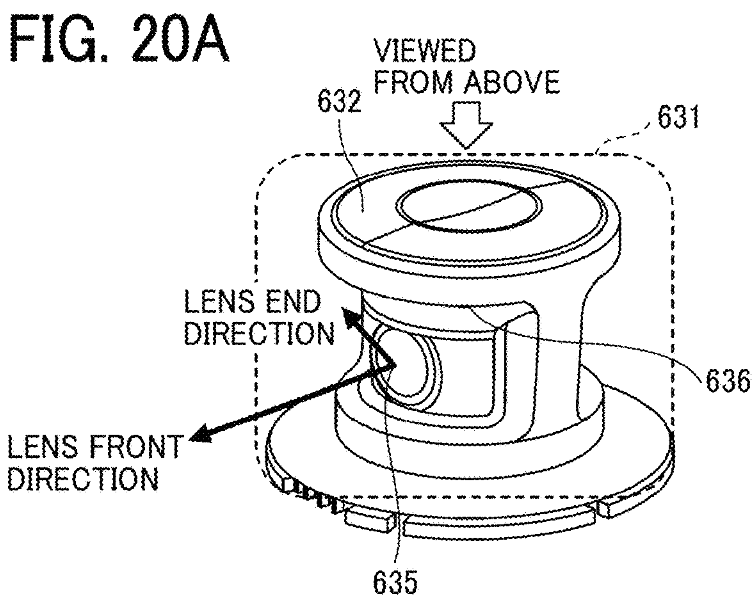
FIG. 20A and FIG. 20B are a perspective view and a top view of the upper hood as viewed from above, respectively, according to one embodiment of the present disclosure.
Figure 20B:
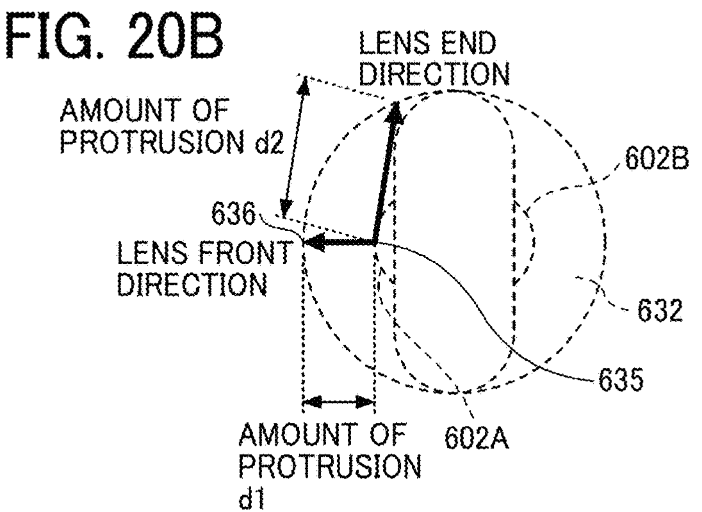

Next, adjustment of the incident angle θ according to the amount of protrusion of the upper hood 632 will be described with reference to FIGS. 20A and 20B. FIG. 20A is a perspective view of the upper hood 632. FIG. 20B is a top view of the upper hood 632 as viewed from above. The incident angle θ is adjustable by changing an amount of protrusion d1 in a lens front direction. The amount of protrusion d1 in the lens front direction represents a distance from the upper hood protrusion 636 to the lens vertex 635, namely, a length projected onto a horizontal plane.

In FIG. 20B, as an example, the upper hood 632 has a circular shape when the omnidirectional camera unit 631 is viewed from above. The lens front direction is defined as a lens optical axis passing through the lens vertex 635 (a direction from the lens vertex 635 toward a point in space corresponding to the center of a captured image). The direction in which the angle of view is widest in the horizontal direction with reference to the lens vertex 635 (a direction toward a point in space corresponding to an edge of a captured image in the horizontal direction) is defined as a lens end direction. The amount of protrusion d1 in the lens front direction is shorter than an amount of protrusion d2 in the lens end direction. Thus, the incident angle θ in the lens end direction is limited to an angle smaller than the incident angle θ in the lens front direction. The lens end direction coincides with the direction in which a seam appears in the panoramic image.

Accordingly, limiting the incident angle θ in the lens end direction to an angle smaller than the incident angle θ in the lens front direction makes it possible to reduce the adverse effect of direct light on a seam while keeping the brightness of the entire panoramic image consistent.

The incident angle θ in the lens end direction is preferably greater than or equal to approximately 30 degrees and less than or equal to approximately 45 degrees. Setting the incident angle θ in the lens end direction to an angle less than or equal to 45 degrees makes it possible to further reduce flare or ghosting generated at a lens end and prevent or reduce a change in color or an image shift at a seam of the panoramic image. In addition, keeping the incident angle θ greater than or equal to 30 degrees makes it possible to secure the viewing angle and the brightness sufficient to capture an image of a person. The term "approximately 30 degrees to approximately 45 degrees" does not mean exactly 30 degrees to exactly 45 degrees, but refers to approximately an angle in the range of approximately 30 degrees to approximately 45 degrees.

Further, as expressed in Equation (2) below, the ratio $R_\theta$ of the incident angle θ in the lens front direction to the incident angle θ in the lens end direction is preferably less than or equal to 2.

$$R_\theta = \frac{\theta(\text{Lens front direction})}{\theta(\text{Lens end direction})} \leq 2 \qquad (2)$$

The reason for this is as follows. When the ratio $R_\theta$ is greater than 2, the incident angle θ is extremely limited in the lens end direction with respect to the lens front direction, resulting in the image portion in the lens front direction becoming bright and the image portion in the lens end direction becoming dark. As a result, the panoramic image has non-uniform brightness.

Setting the ratio $R_\theta$ to a value less than or equal to 2 makes it possible to reduce the difference in brightness between the image portion in the lens front direction and the image portion in the lens end direction.

Figure 21:
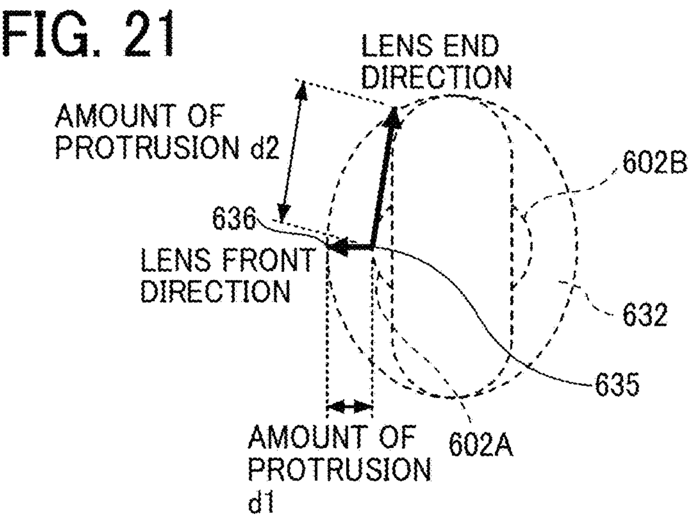
FIG. 21 is a top view of the upper hood when the upper hood has an elliptical shape as viewed from above according to one embodiment of the present disclosure.

FIG. 21 is a top view of the upper hood 632 when the upper hood 632 has an elliptical shape as viewed from above. As illustrated in FIG. 21, the upper hood 632 may have an elliptical shape, rather than a circular shape, when viewed from above the meeting device 60. The elliptical shape of the upper hood 632 limits the incident angle θ in the lens end direction to an angle smaller than the incident angle θ in the lens front direction.

Figure 22A:
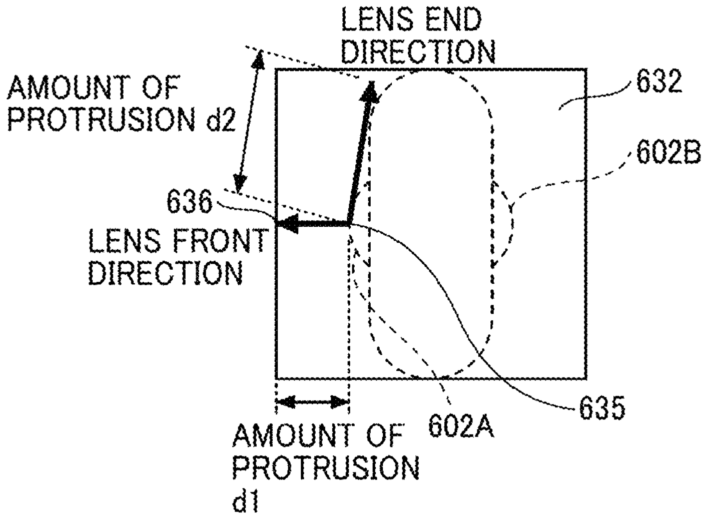
FIG. 22A is a top view of the upper hood when the upper hood has a rectangular shape as viewed from above according to one embodiment of the present disclosure.
Figure 22B:
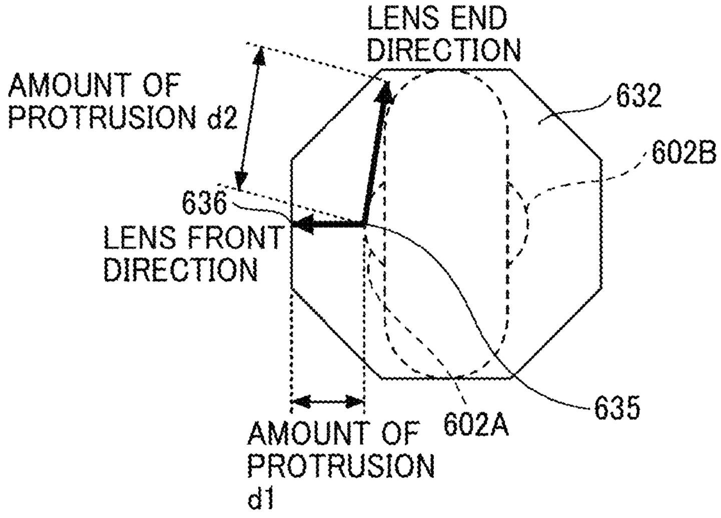
FIG. 22B is a top view of the upper hood when the upper hood has an octagonal shape as viewed from above according to one embodiment of the present disclosure.

When viewed from above, the upper hood 632 may have any shape such as a rectangular shape or an octagonal shape that limits the incident angle θ. FIG. 22A is a top view of the upper hood 632 when the upper hood 632 has a rectangular shape as viewed from above. FIG. 22B is a top view of the upper hood 632 when the upper hood 632 has an octagonal shape as viewed from above. The upper hood 632 having a rectangular shape is easily processed. The upper hood 632 having an octagonal shape allows the user to easily grasp the orientations of the lenses 602A and 602B, and facilitates adjustment of the orientations of the lenses 602A and 602B such that light from the ceiling light is less likely to cause flare or ghosting when the user installs the meeting device 60.

As illustrated in FIG. 23, the upper hood 632 may include a light shielding member that adjusts the incident angle of light. FIG. 23 illustrates the functions of light shielding members 643 and 644 of the upper hood 632. FIG. 23(*a*) illustrates that the light shielding members 643 and 644 are accommodated in the upper hood 632. FIG. 23(*b*) illustrates that the light shielding members 643 and 644 are pulled out from the upper hood 632.

The light shielding members 643 and 644 are thin plates and are usually accommodated in an upper surface of the upper hood 632. In one example, the user pulls out or pushes in the light shielding members 643 and 644 with his or her finger. The user pulls out the light shielding members 643 and 644, thereby reducing the incident angle of light. The user pushes in the light shielding members 643 and 644, thereby increasing the incident angle of light. This configuration allows the user viewing the actually created panoramic image to pull out the light shielding members 643 and 644 to appropriate pull-out positions to obtain a bright panoramic image without flare.

Side View of Upper Hood

Figure 24A:
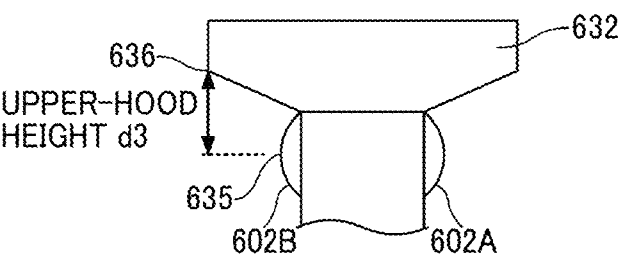
FIG. 24A and FIG. 24B are views of the upper hood, illustrating the shape of the upper hood as viewed from the side according to one embodiment of the present disclosure.
Figure 24B:
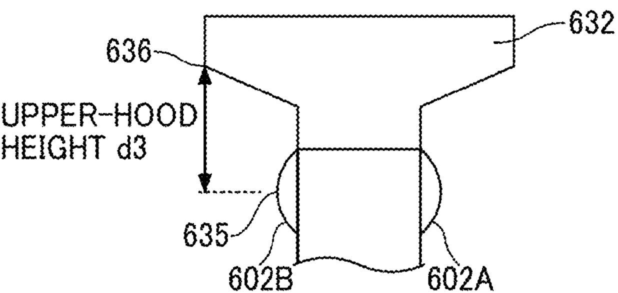

Next, a side view of the upper hood 632 will be described with reference to FIGS. 24A and 24B. FIGS. 24A and 24B illustrate the shape of the upper hood 632 as viewed from the side. The incident angle θ is also adjustable by changing the linear distance (an upper-hood height d3) between the upper hood protrusion 636 and the optical axis. In one example, as illustrated in FIG. 24A, the upper-hood height d3 is reduced to reduce the incident angle θ. As illustrated in FIG. 24B, conversely, the upper-hood height d3 is increased to increase the incident angle θ.

Figure 25A:
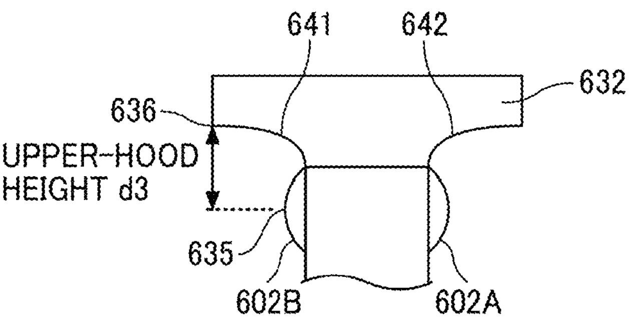
FIG. 25A and FIG. 25B are views of an upper hood, illustrating example shapes of a side surface of the upper hood.
Figure 25B:
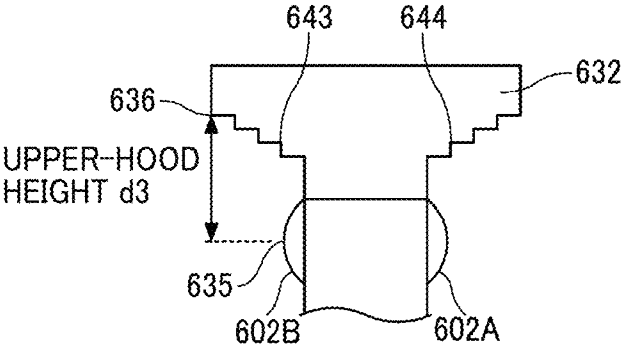

If the incident angle θ can be limited to a desired angle, the upper-hood height d3 can be set as desired. In addition, an extendable mechanism that extends and contracts to adjust the height of the upper hood 632 may be provided. The upper hood 632 may have a smooth inclined or curved shape or a stepped shape from upper portions of the lenses 602A and 602B to the upper hood protrusion 636. FIGS. 25A and 25B illustrate example shapes of a side surface of the upper hood 632. FIG. 25A illustrates an example in which side surfaces 641 and 642 have an inward-curving shape from the upper portions of the lenses 602B and 602A to the upper hood protrusion 636, respectively. FIG. 25B illustrates an example in which side surfaces 643 and 644 have a stepped shape from the upper portions of the lenses 602B and 602A to the upper hood protrusion 636, respectively. The shapes illustrated in FIGS. 25A and 25B have an effect of making it difficult for light incident on the lower side of the upper hood 632 to enter the lenses 602A and 602B even when the light is reflected by the side surfaces 641 and 642 or 643 and 644 having the illustrated shape.

Example of Panoramic Image Captured by Meeting Device

Figure 26A:
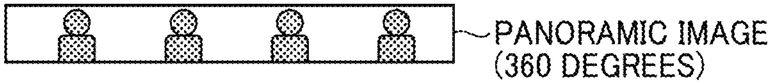
FIG. 26A, FIG. 26B, FIG. 26C, and FIG. 26D are illustrations of display examples in which the terminal apparatus displays a panoramic image as a final output image according to one embodiment of the present disclosure.
Figure 26B:
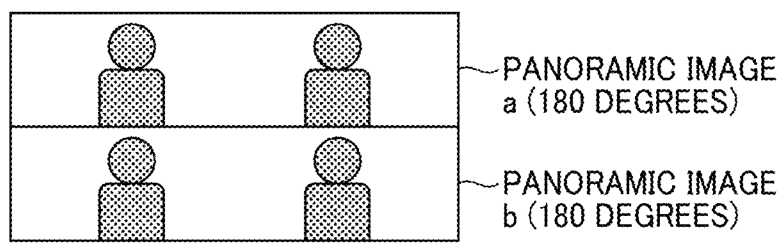
Figure 26C:
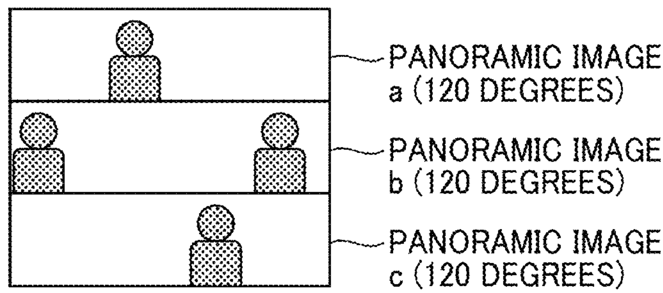

Display examples of the panoramic image will be described with reference to FIGS. 26A to 26D. FIGS. 26A to 26D illustrate display examples in which the terminal apparatus 10 displays a panoramic image as a final output image. In one embodiment, the panoramic image displayed by the terminal apparatus 10 is obtained by reconstructing images and output as a final output image. FIG. 26A illustrates a display example in which a panoramic image of the entire 360-degree area is displayed in one stage. FIG. 26B illustrates a display example in which the panoramic image is displayed in two stages, with each stage displaying a 180-degree panoramic image. FIG. 26C illustrates a display example in which the panoramic image is displayed in three stages, with each stage displaying a 120-degree panoramic image.

In any of the display examples, by viewing the panoramic image or the panoramic images, a participant who is participating in the web conference can check the 360-degree omnidirectional area. In addition, the terminal apparatus 10 displays a panoramic image in a desired number of stages, thereby making the panoramic image displayable on a display at a desired aspect ratio and size.

Figure 26D:
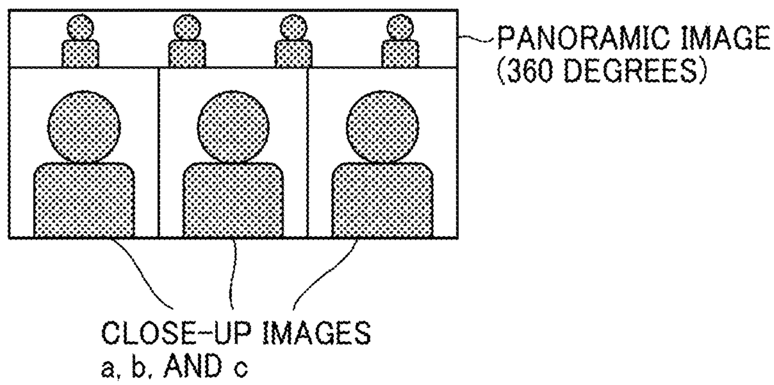

FIG. 26D illustrates a display example in which the panoramic image and close-up images are displayed in combination. The close-up images are obtained by trimming areas such as areas of participants off of the panoramic image and appropriately enlarging the trimmed areas.

The areas to be closed up may include, for example, an area of a talker, an area of a non-talker, an area of the electronic whiteboard, and an area designated by the user. In FIG. 26D, the panoramic image displays the 360-degree omnidirectional area, and close-up images a, b, and c display details of areas of the conference room that are difficult to view in the panoramic image.

The final output image is not limited to the examples described above and may be displayed in any layout based on a created panoramic image.

Screen Transitions

Figure 27:
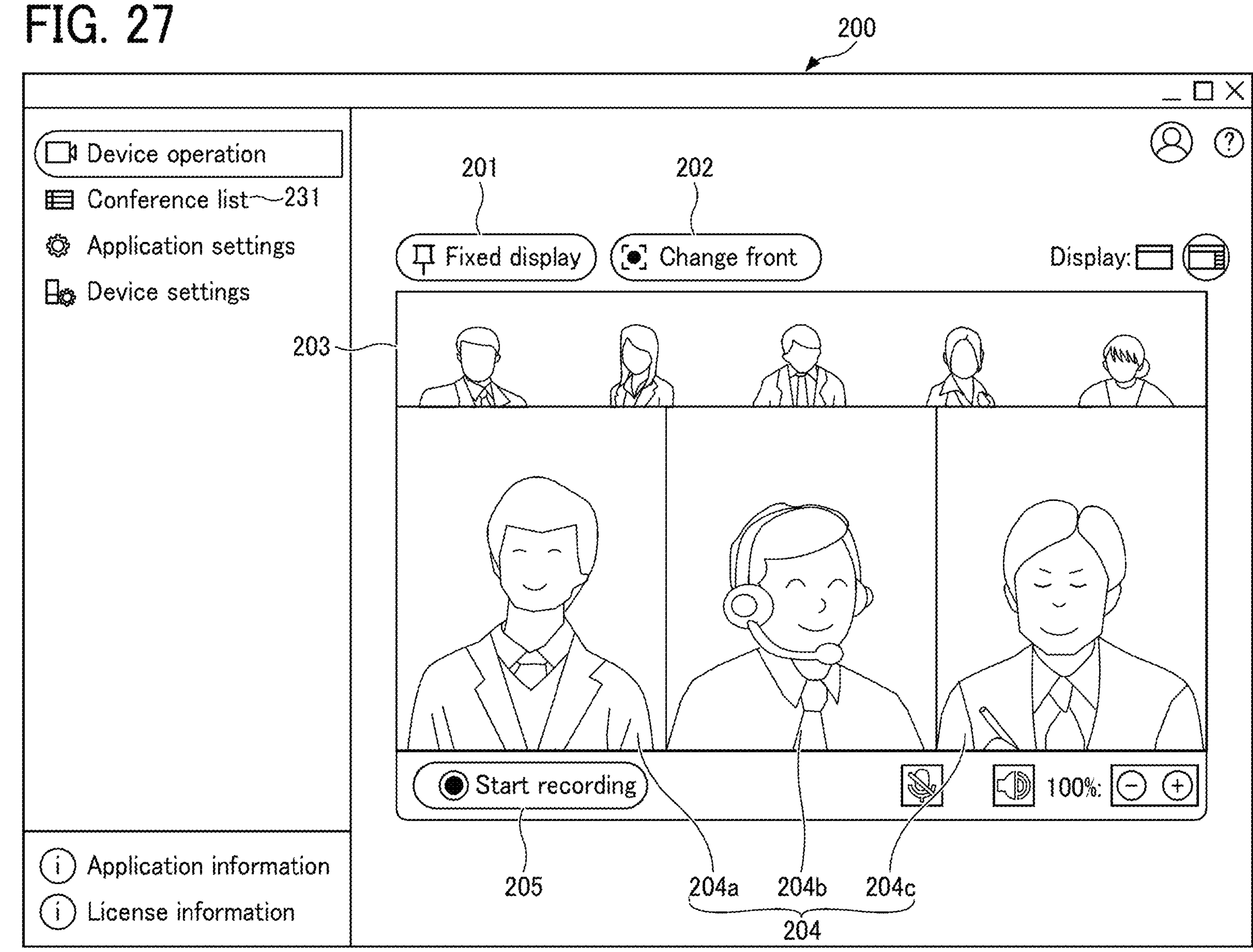
FIG. 27 is an illustration of an example of an initial screen displayed by an information recording application operating on the terminal apparatus after login.

Several screens displayed by the terminal apparatus 10 during a teleconference will be described with reference to FIGS. 27 to 36. FIG. 27 illustrates an initial screen 200 displayed by the information recording application 41 operating on the terminal apparatus 10 after a login. The user of the terminal apparatus 10 connects the information recording application 41 to the information processing system 50. When the user inputs authentication information and the login is successful, the initial screen 200 illustrated in FIG. 27 is displayed.

The initial screen 200 includes a "Fixed display" button 201, a "Change front" button 202, a panoramic image 203, one or more talker images 204*a*, 204*b*, and 204*c*, and a "Start recording" button 205. The talker images 204*a* to 204*c* are hereinafter referred to as talker images 204 unless otherwise distinguished from one another. In a case where the meeting device 60 has already been activated and is capturing an image of the surroundings at the time of the login, the initial screen 200 displays the panoramic image 203 and the talker images 204 created by the meeting device 60. The initial screen 200 allows the user to decide whether to start recording while viewing the panoramic image 203 and the talker images 204. In a case where the meeting device 60 has not been activated (and is not capturing any image), the panoramic image 203 and the talker images 204 are not displayed.

The information recording application 41 may display the talker images 204 of all the participants based on all the faces detected from the panoramic image 203, or may display the talker images 204 of N persons who have most recently made utterances. In FIG. 27, in one example, the talker images 204 of up to three persons are displayed. In one example, the display of the talker images 204 may be omitted until any of the participants makes an utterance. In this case, the number of talker images 204 increases by one in response to one of the participants making an utterance. In another example, the talker images 204 of three participants in a predetermined direction may be displayed. In this case, the talker images 204 are changed depending on utterances that have been made.

When none of the participants has made an utterance, such as immediately after the meeting device 60 has been activated, images of areas in predetermined directions (such as 0 degrees, 120 degrees, and 240 degrees) in the horizontal 360-degree direction are created as the talker images 204. In a case where a fixed-display setting (described below) has been set, the fixed-display setting is prioritized.

The "Fixed display" button 201 is a button for the user to perform an operation of fixing a certain area of the panoramic image 203 as a talker image 204 in close-up.

Figure 28:
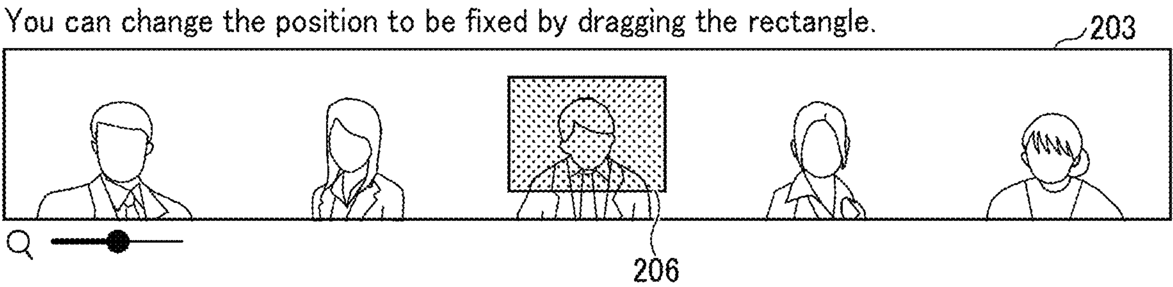
FIG. 28 is an illustration of a panoramic image, illustrating an operation performed when a "Fixed display" button is in an "on" position, according to one embodiment of the present disclosure.

FIG. 28 is an illustration of the panoramic image 203, illustrating an operation performed when the "Fixed display" button 201 is in an "on" position. For example, the user moves a rectangular window 206 across the panoramic image 203 with a pointing device such as a mouse or a touch panel. The user places the window 206 over an area including, for example, the electronic whiteboard or the desk in the panoramic image 203. The operation performed by the user is transmitted to the meeting device 60. The meeting device 60 generates an image of a range selected by the window 206 from 360 degrees in the horizontal direction in the same size as one of the talker images 204, and transmits the generated image to the terminal apparatus 10. This allows an object other than a talker, such as the whiteboard, to be continuously displayed in a talker image 204.

Referring back to FIG. 27, the "Change front" button 202 is a button for the user to perform an operation of changing the front of the panoramic image 203 (since the panoramic image covers 360 degrees in the horizontal direction, the right and left edges of the panoramic image match in the same direction). In one example, the user uses a pointing device to slide the panoramic image 203 to the left or right to determine a participant who is to appear in the front. The operation performed by the user is transmitted to the meeting device 60. The meeting device 60 changes an angle to be set as the front among 360 degrees in the horizontal direction, creates a panoramic image, and transmits the panoramic image to the terminal apparatus 10.

Figure 30:
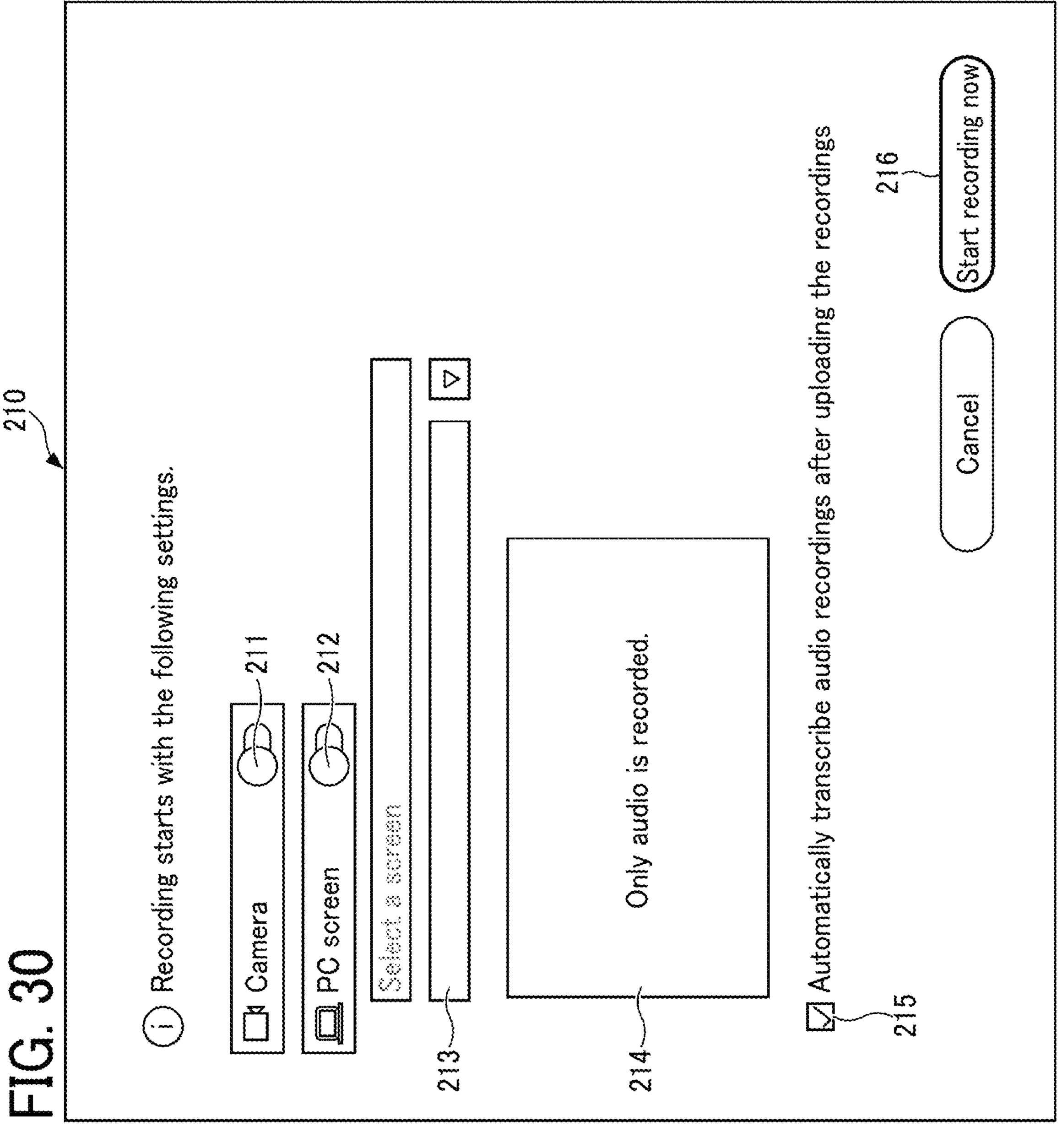
FIG. 30 is an illustration of an example of a recording setting screen displayed by the information recording application.

In response to the user pressing the "Start recording" button 205, the information recording application 41 displays a recording setting screen 210 illustrated in FIG. 30.

Figure 29:
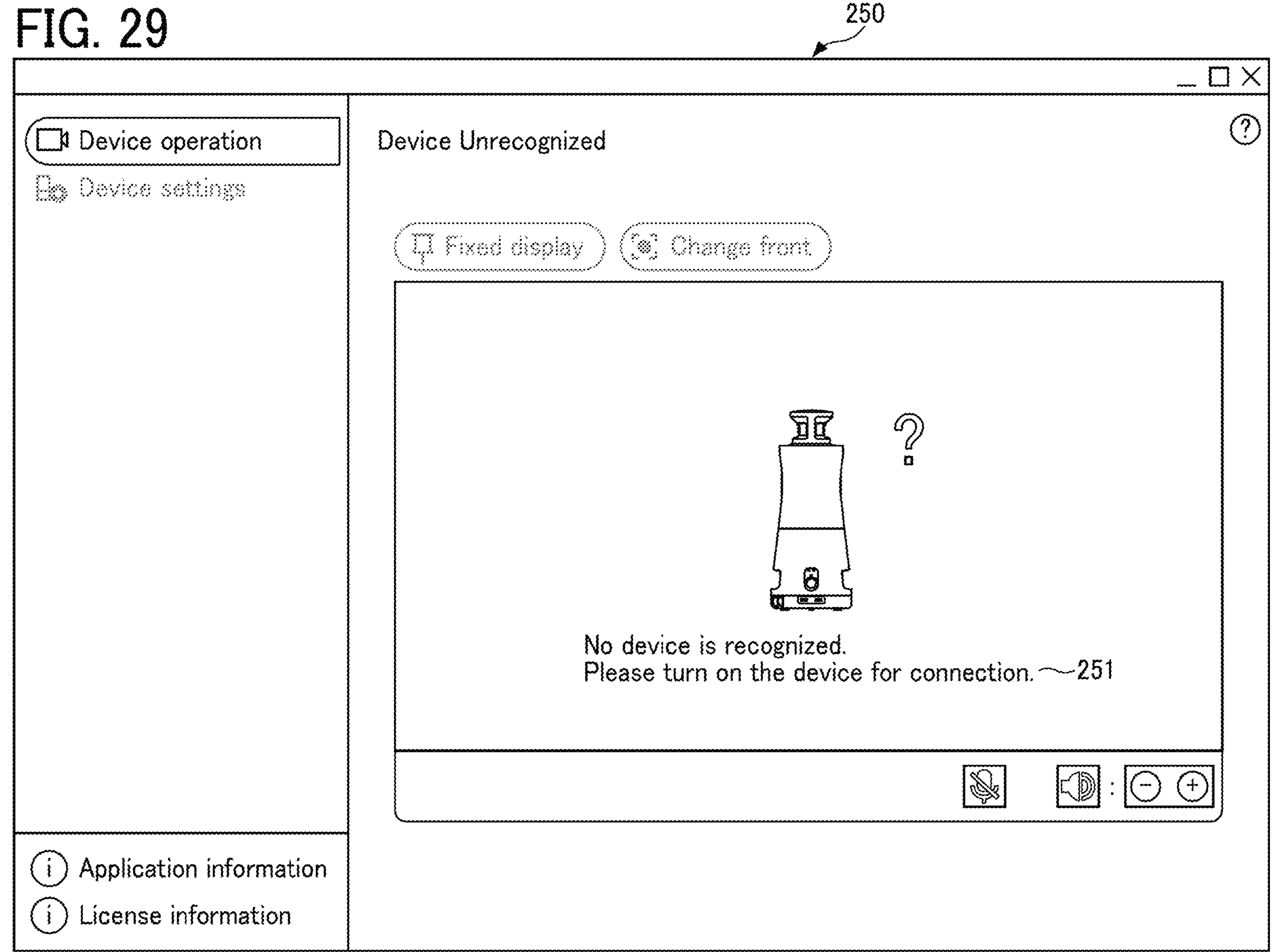
FIG. 29 is an illustration of an example of a "Device Unrecognized" screen.

In a case where the meeting device 60 has not been connected or powered on at the time of activation of the information recording application 41, a "Device Unrecognized" screen 250 illustrated in FIG. 29 is displayed.

FIG. 29 illustrates of an example of the "Device Unrecognized" screen 250. The "Device Unrecognized" screen 250 displays a message 251 stating "No device is recognized. Please turn on the device for connection". The user viewing the message 251 checks the power state and the connection state of the meeting device 60.

FIG. 30 illustrates an example of the recording setting screen 210 displayed by the information recording application 41. The recording setting screen 210 allows the user to set whether to record (whether to include in recorded video) the panoramic image 203 and the talker images 204 created by the meeting device 60 and a desktop screen of the terminal apparatus 10 or a screen of an application operating on the terminal apparatus 10. In a case where the information recording application 41 is set to record none of the panoramic image 203, the talker images 204, and the desktop screen or the screen of the operating application, the information recording application 41 records audio (audio output from the terminal apparatus 10 and audio collected by the meeting device 60).

A camera toggle button 211 is a button for turning on and off the recording of the panoramic image 203 and the talker images 204 created by the meeting device 60. The camera toggle button 211 may be set to turn on and off the recording of the panoramic image 203 and the talker images 204 individually.

A PC screen toggle button 212 is a button for turning on and off the recording of the desktop screen of the terminal apparatus 10 or a screen of an application operating on the terminal apparatus 10. When the PC screen toggle button 212 is in the "on" position, the desktop screen is recorded.

When the user desires to record the screen of the application, the user further selects the application in an application selection field 213. The application selection field 213 displays names of applications operating on the terminal apparatus 10 in a pull-down format. Accordingly, the user selects an application for which the screen is to be recorded. The information recording application 41 acquires the names of the applications from the OS. In one embodiment, the information recording application 41 displays names of applications that have a user interface (UI) (screen) among applications operating on the terminal apparatus 10. The applications to be selected may include the teleconferencing application 42. Thus, in one embodiment, the information recording application 41 records, for example, a document displayed by the teleconferencing application 42 and participants at respective sites in a moving image form. The names of the applications displayed in the application selection field 213 in the pull-down format also include names of various applications operating on the terminal apparatus 10, such as a presentation application, a word processing application, a spreadsheet application, a document application for creating and editing a document, an electronic whiteboard application in a cloud service, and a web browser application. This allows the user to flexibly select a screen of an application to be included in the video record.

When recording is performed in units of applications, the user may select a plurality of applications. The information recording application 41 may record the screens of all the selected applications.

When both the camera toggle button 211 and the PC screen toggle button 212 are in the "off" position, a message stating "Only audio is recorded" is displayed in a recording content confirmation window 214. In this case, the audio includes audio output from the terminal apparatus 10 (audio received by the teleconferencing application 42 from the other site 101) and audio collected by the meeting device 60. That is, when a teleconference is being held, the audio acquired by the teleconferencing application 42 and the audio acquired by the meeting device 60 are stored regardless of whether the images are recorded. The user settings may allow the user to selectively stop storing the audio acquired by the teleconferencing application 42 and the audio acquired by the meeting device 60.

In accordance with a combination of turning on and off of the camera toggle button 211 and the PC screen toggle button 212, the recording of video is performed in the following manner. The recording content confirmation window 214 displays a video record in real time.

In a case where the camera toggle button 211 is in the "on" position and the PC screen toggle button 212 is in the "off" position, the panoramic image 203 and the talker images 204 captured by the meeting device 60 are displayed in the recording content confirmation window 214.

In a case where the camera toggle button 211 is in the "off" position and the PC screen toggle button 212 is in the "on" position (and the screen has also been selected), the desktop screen or the screen of the selected application is displayed in the recording content confirmation window 214.

In a case where the camera toggle button 211 is in the "on" position and the PC screen toggle button 212 is in the "on" position, the panoramic image 203 and the talker images 204 captured by the meeting device 60 and the desktop screen or the screen of the selected application are displayed side by side in the recording content confirmation window 214.

Accordingly, there is a case where the panoramic image 203, the talker images 204, and the screen of the application are not recorded, or a case where none of the panoramic image 203, the talker images 204, and the screen of the application is recorded. However, in the present embodiment, an image created by the information recording application 41 is referred to as a video record, for the convenience of description.

Figure 31:
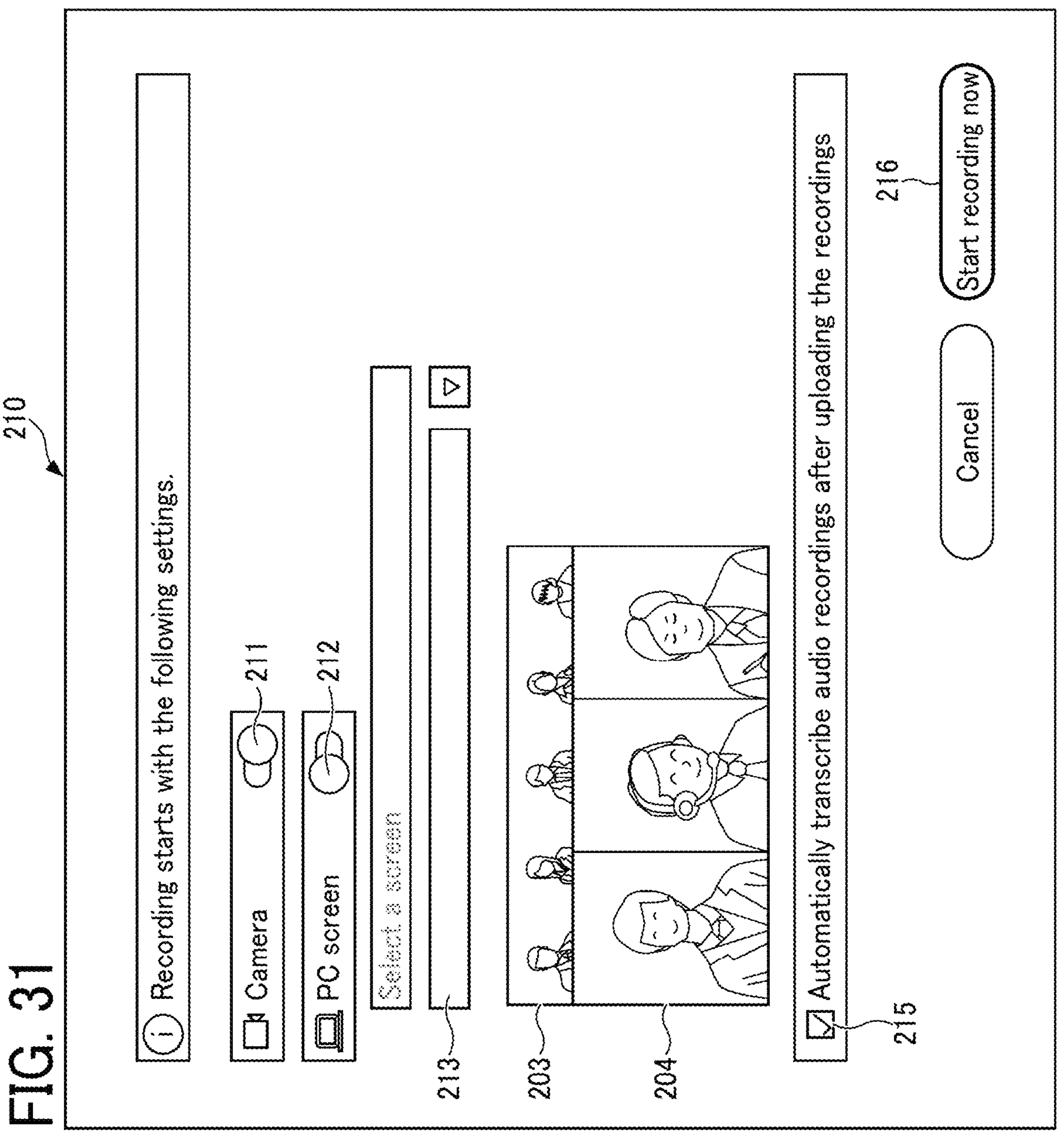
FIG. 31 is an illustration of a display example of a recording content confirmation window when a camera toggle button is in an "on" position and a personal computer (PC) screen toggle button is in an "off" position.

FIG. 31 illustrates a display example of the recording content confirmation window 214 when the camera toggle button 211 is in the "on" position and the PC screen toggle button 212 is in the "off" position. In FIG. 31, the panoramic image 203 and the talker images 204 are displayed in large size.

Figure 32:
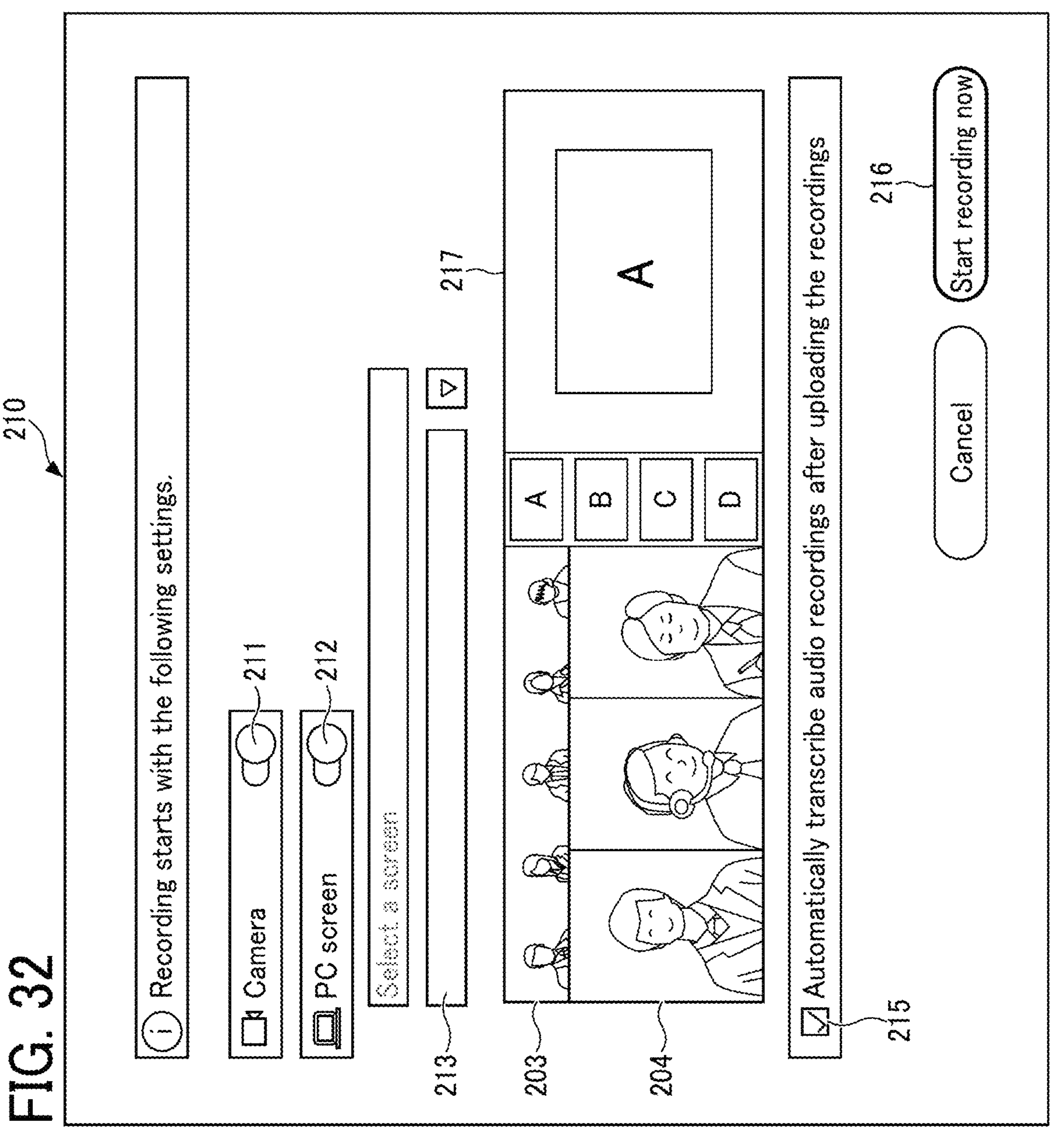
FIG. 32 is an illustration of a display example of the recording content confirmation window when the camera toggle button is in the "on" position and the PC screen toggle button is in an "on" position.

FIG. 32 illustrates a display example of the recording content confirmation window 214 when the camera toggle button 211 is in the "on" position and the PC screen toggle button 212 is in the "on" position. In FIG. 32, the panoramic image 203 and the talker images 204 are displayed on the left side, and an application screen 217 is displayed on the right side.

Accordingly, the recording content confirmation window 214 allows the user to check the content of a video record to be recorded (specifically, the images acquired by the meeting device 60) according to the settings set on the recording setting screen 210 before starting the recording.

In FIG. 32, a display example of the video record when a single application is selected is presented. In a case where two or more applications are selected, in one example, the screens of the second and subsequent applications are sequentially connected rightward. In another example, the screens of the second and subsequent applications may be arranged vertically and horizontally in two dimensions.

Referring back to FIG. 30, the description is continued. The recording setting screen 210 further includes a check box 215 with a message stating "Automatically transcribe audio recordings after uploading the recordings". The recording setting screen 210 further includes a "Start recording now" button 216. When the user checks the check box 215, text data converted from utterances made during the teleconference is attached to the video record. In this case, after the end of recording, the information recording application 41 uploads audio data to the information processing system 50 together with a request for converting the audio data into text data. When the user presses the "Start recording now" button 216, a recording-in-progress screen 220 illustrated in FIG. 33 is displayed.

Figure 33:
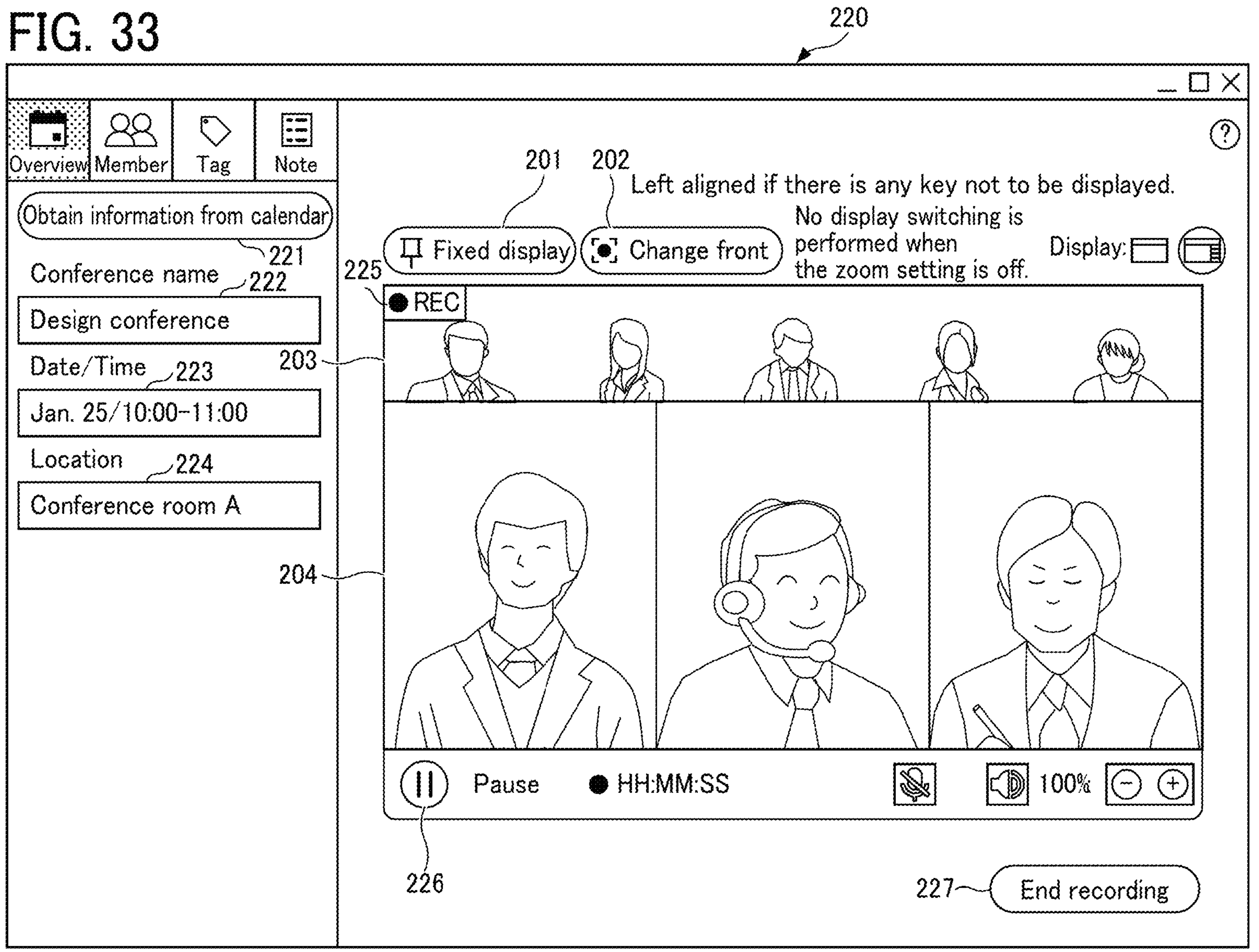
FIG. 33 is an illustration of an example of a recording-in-progress screen displayed by the information recording application during the recording of video.

FIG. 33 illustrates an example of the recording-in-progress screen 220 displayed by the information recording application 41 during the recording of video. In the description of FIG. 33, differences from FIG. 30 will be described. The recording-in-progress screen 220 displays, in real time, a video record to be recorded according to the conditions set by the user on the recording setting screen 210. The recording-in-progress screen 220 illustrated in FIG. 33 is displayed in a case where the camera toggle button 211 is in the "on" position and the PC screen toggle button 212 is in the "off" position, and displays the panoramic image 203 and the talker images 204 (both of which are moving images) created by the meeting device 60. The recording-in-progress screen 220 displays a recording icon 225, a pause button 226, and an "End recording" button 227.

When the user sets the PC screen toggle button 212 to the "on" position, as illustrated in FIG. 32, the recording-in-progress screen 220 displays the desktop screen or the application screen 217 adjacent to the panoramic image 203 and the talker images 204.

The pause button 226 is a button for pausing the recording. The pause button 226 also receives an operation of resuming the recording after the recording is paused. The "End recording" button 227 is a button for ending the recording. The "End recording" button 227, rather than the pause button 226, is used for switching between recorded video IDs. In one example, after pausing or temporarily stopping the recording, the user sets the recording conditions set again on the recording setting screen 210 before resuming the recording. In this case, the information recording application 41 may create a plurality of recorded video files each time the recording is stopped (e.g., when the "End recording" button 227 is pressed), or may consecutively connect a plurality of recorded video files into one video (e.g., when the pause button 226 is pressed). In another example, the information recording application 41 may display (play) a video record by consecutively displaying a plurality of recorded video files as one video.

The recording-in-progress screen 220 includes an "Obtain information from calendar" button 221, a conference name field 222, a time field 223, and a location field 224. The "Obtain information from calendar" button 221 is a button for the user to obtain conference information from the conference management system 9. When the user presses the "Obtain information from calendar" button 221, the information recording application 41 acquires a list of conferences that the user has a right to view from the information processing system 50 and displays the acquired list of conferences. The user selects a teleconference to be held from the list of conferences. In one embodiment, the information recording application 41 also acquires the application-side conference information. Thus, the conference information is reflected in the conference name field 222, the time field 223, and the location field 224. The title in the conference information is reflected in the conference name field 222. The start time and the end time in the conference information are reflected in the time field 223. The location included in the conference information is reflected in the location field 224. In addition, the information on the teleconference in the conference management system 9 is associated with an information record by the conference ID.

When the teleconference ends and the user ends the recording, a video record with audio is created.

Figure 34:
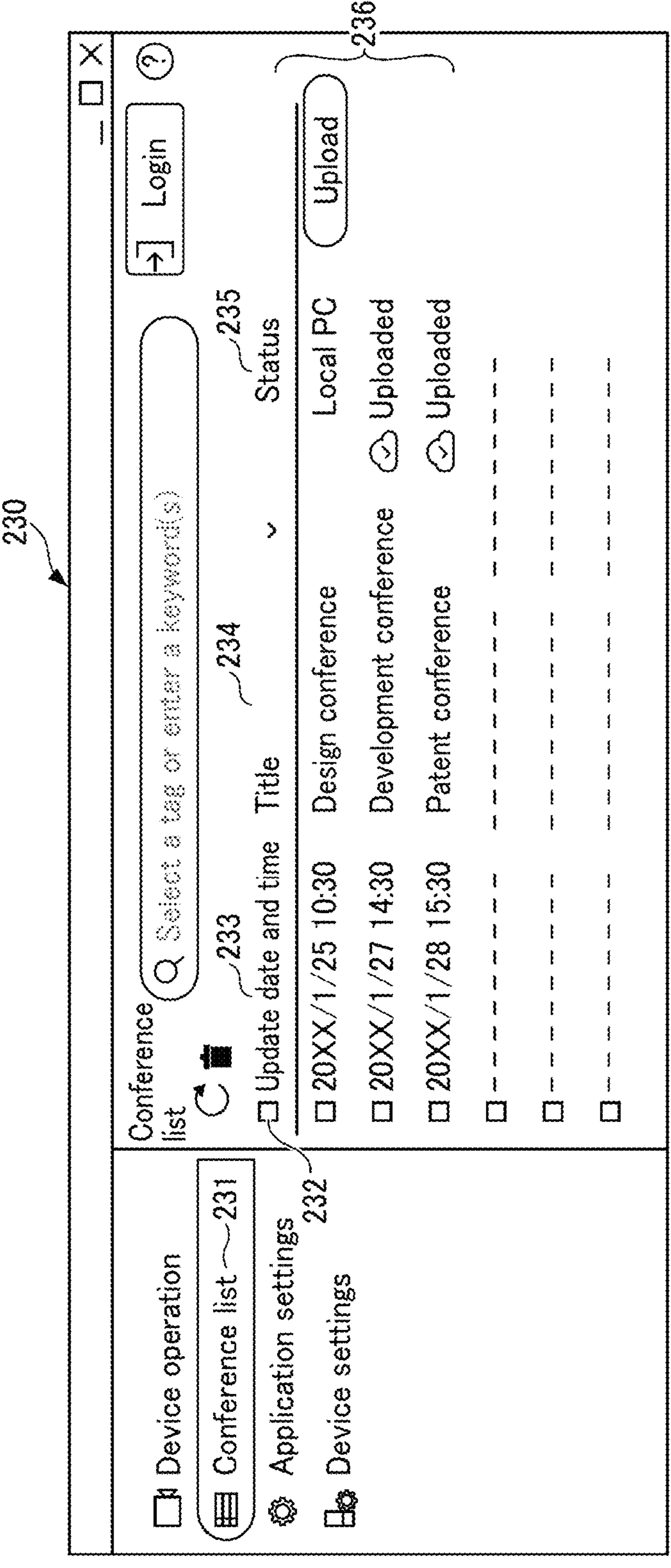
FIG. 34 is an illustration of an example of a conference list screen displayed by the information recording application.

FIG. 34 illustrates an example of a conference list screen 230 displayed by the information recording application 41. The conference list screen 230 displays a list of conferences. Specifically, the conference list screen 230 displays a list of information records that are videos recorded in teleconferences. The list of conferences includes conferences held in a certain conference room regardless of whether the conferences are teleconferences.

The conference list screen 230 presents, in an integrated manner, the conference information that is stored in the conference information storage unit 3001 and that the login user has a right to view, the application-side conference information, and the information associated with the teleconference and stored in the recorded video information storage unit 5002. The moving image recording information stored in the information storage unit 1001 may also be integrated on the conference list screen 230.

The conference list screen 230 is displayed in response to the user selecting a conference list tab 231 on the initial screen 200 illustrated in FIG. 27. The conference list screen 230 displays a list 236 of information records that the user has a right to view. In one embodiment, a conference creator (a person who creates the minutes of a conference) assigns permissions to view the record of the conference to the participants in the conference. In one example, the list of conferences may be a list of stored information records. In another example, the list of conferences may be a list of conference schedules or a list of items of conference data.

The conference list screen 230 includes a check box 232 and items, namely, an update date and time 233, a title 234, and a status 235.

The check box 232 receives selection of a recorded video file. The check box 232 is used when the user desires to delete a collection of recorded video files.

The update date and time 233 indicates a recording start time and a recording end time of a video record. For an edited video record, the update date and time 233 indicates the date and time of editing.

The title 234 indicates the title (e.g., subject) of the conference. The title 234 may be transcribed from the conference information or set by the user.

The status 235 indicates whether each video record has been uploaded to the information processing system 50. For a video record that has not been uploaded, the status "local PC" is displayed. For a video record that has been uploaded, the status "uploaded" is displayed. For a video record that has not been uploaded, an "Upload" button is displayed. In a case where a video record that has not been uploaded is present, in one example, the information recording application 41 automatically uploads the video record when the user logs into the information processing system 50.

Figure 35:
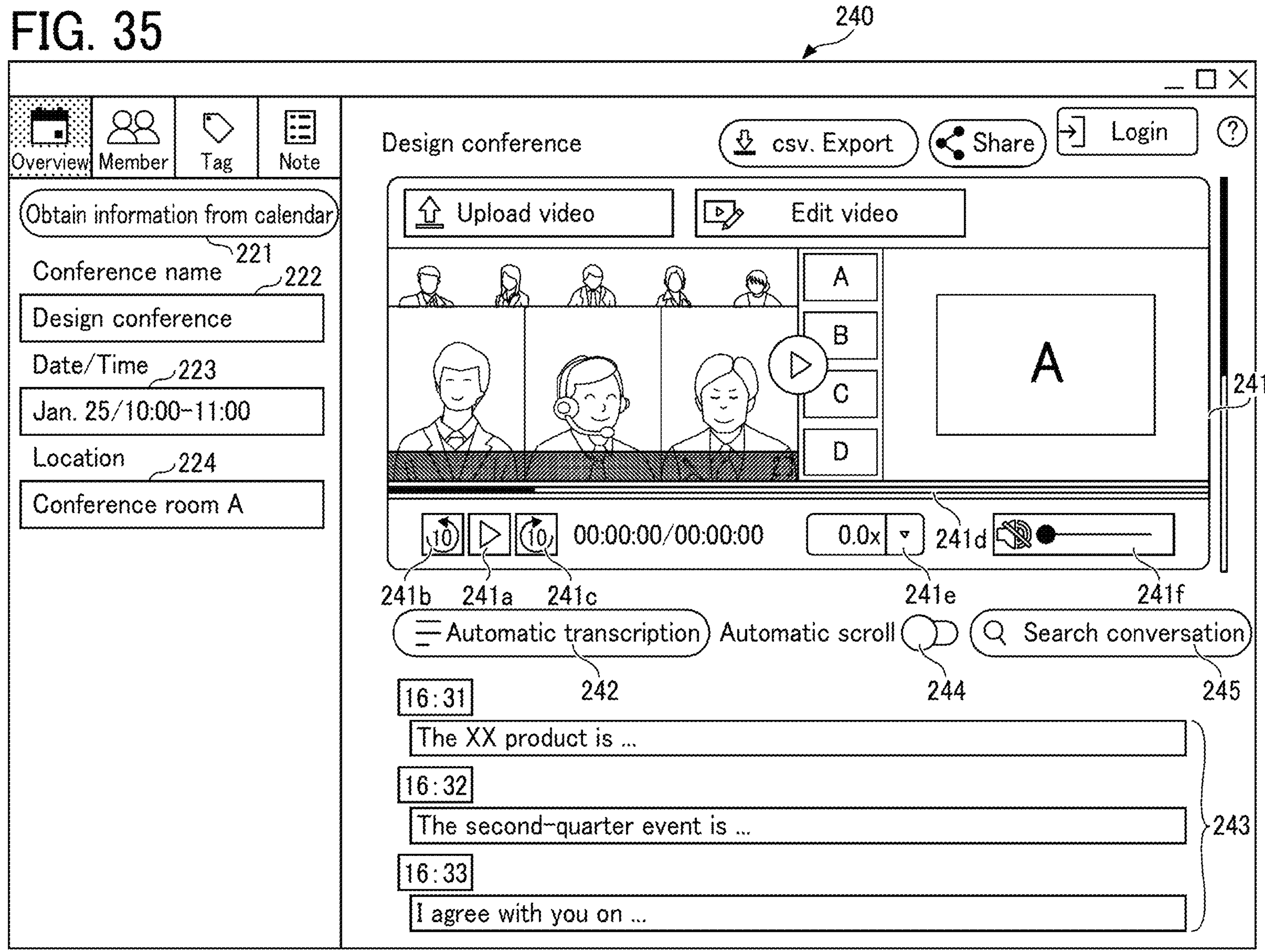
FIG. 35 is an illustration of an example of a video record display screen displayed by the information recording application after a video record is selected.

In response to the user selecting, for example, a desired title from the list 236 of information records with a pointing device, the information recording application 41 displays a video record display screen 240 illustrated in FIG. 35. In one embodiment, the video record display screen 240 displays (plays) a video record.

FIG. 35 illustrates an example of the video record display screen 240 displayed by the information recording application 41 after a video record is selected. The video record display screen 240 includes an image display field 241, a transcription button 242, one or more text display fields 243, an automatic scroll button 244, and a search button 245.

The image display field 241 includes a play button 241*a*, a rewind button 241*b*, a fast forward button 241*c*, a time indicator 241*d*, a play speed button 241*e*, and an audio volume button 241*f*. The image display field 241 displays a video record. In FIG. 35, the image display field 241 displays the video record such that the panoramic image and the talker images are arranged on the left side and the screen of the teleconferencing application 42 is arranged on the right side. The screen of the teleconferencing application 42 makes a transition to an image of the site or an image of a document during the teleconference. This allows the user to view a screen of a desired scene by operating various buttons.

In a case where the audio data of the video record being displayed in the image display field 241 has been converted into text data, the uttered content is displayed in text in the text display fields 243. The text display fields 243 display text data obtained by converting the combined audio data through speech recognition.

The transcription button 242 is a button for the user to switch whether to display the text data to be displayed in the text display fields 243 so as to correspond to the play time of the video record.

The automatic scroll button 244 is a button for the user to switch whether to automatically scroll the text data irrespective of the play time.

The search button 245 is a button for the user to search the text data by designating a keyword. Details will be described below.

The video record display screen 240 may allow downloading of a video record.

Figure 36:
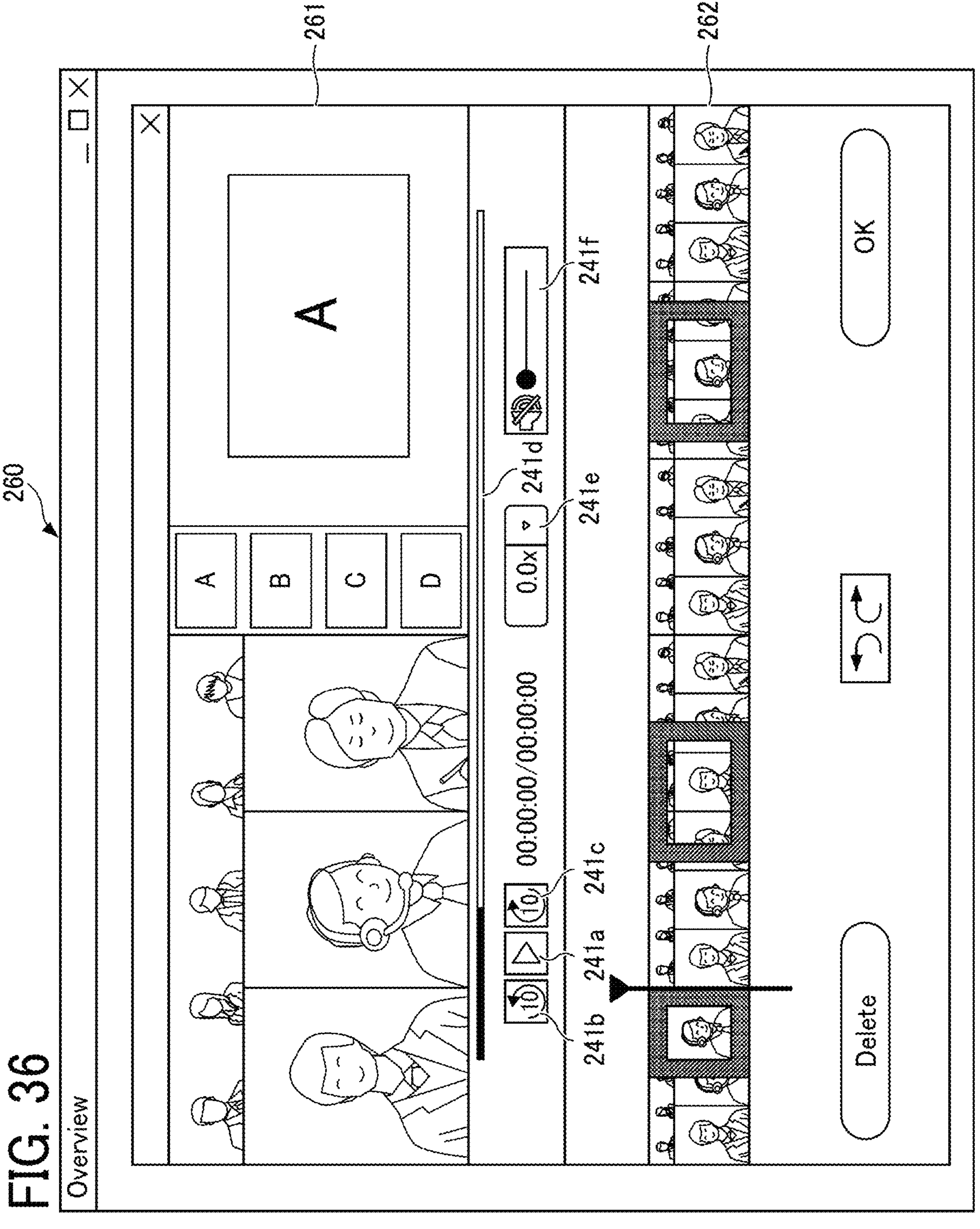
FIG. 36 is an illustration of an example of an edit screen for editing a video record.

FIG. 36 illustrates an example of an edit screen 260 for editing a video record. The edit screen 260 makes a transition from the recording-in-progress screen 220 automatically or in response to the user performing a predetermined operation on the video record display screen 240. The edit screen 260 includes a first display field 261 and a second display field 262. The first display field 261 displays a certain moment in the video record being displayed (played), and the second display field 262 displays frames of the video record in time series. In one example, the user selects one or more frames to delete unwanted frames. In another example, the user extracts a certain frame and insert the extracted frame after a desired frame. The editing processing unit 21 edits the video record in accordance with the user's operation, and overwrites the original video record with the edited video record or stores the edited video record separately.

Procedure of Operation or Processes

A description is now given of an operation and processes performed by the information record display system 100, based on the configuration described above.

Storage of Video Record

Figure 37:
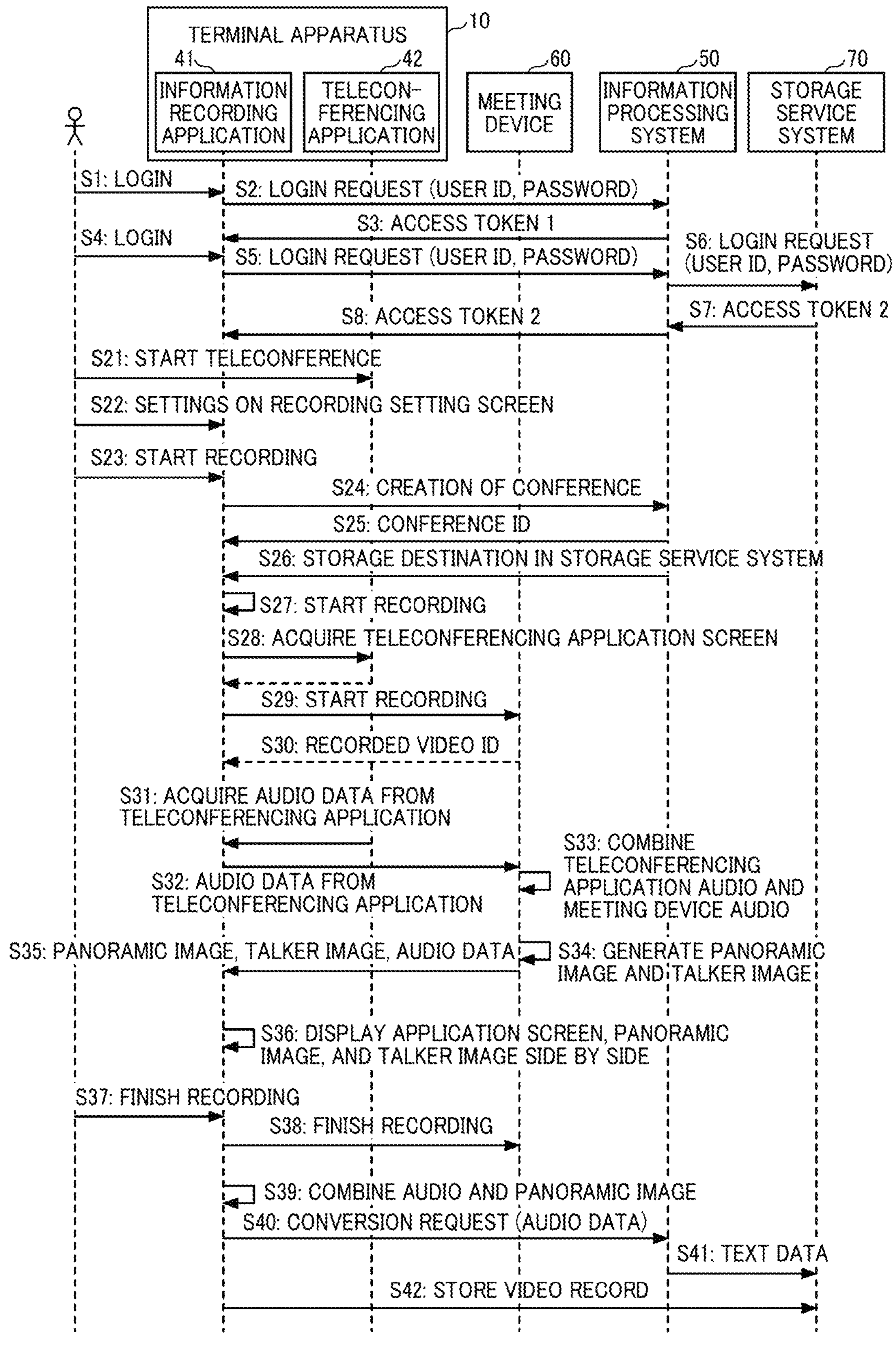
FIG. 37 is a sequence diagram illustrating a process of recording a panoramic image, a talker image, and an application screen by the information recording application, according to one embodiment of the present disclosure.

A process for storing a video record will be described with reference to FIG. 37. FIG. 37 is a sequence diagram illustrating a process of recording a panoramic image, a talker image, and an application screen by the information recording application 41.

S1: The user of the terminal apparatus 10 activates the information recording application 41 and connects the terminal apparatus 10 (the information recording application 41) to the information processing system 50. If the access token has expired, the display control unit 13 displays the login screen. The user inputs authentication information (e.g., a user ID and a password) to the information recording application 41 to log into the tenant. The operation reception unit 12 of the information recording application 41 receives the input of the authentication information.

S2: The communication unit 11 of the information recording application 41 transmits a login request with designation of the authentication information to the information processing system 50.

S3: The communication unit 51 of the information processing system 50 receives the login request, and the authentication unit 52 authenticates the user on the basis of the authentication information. The following description is given on the assumption that the authentication is successful. The communication unit 51 of the information processing system 50 transmits access token 1 to the information recording application 41. The communication unit 51 attaches the access token 1 to subsequent communication with the information processing system 50, which is not described with reference to FIG. 37. The access token 1 is associated with the permissions assigned to the user who has logged in.

S4: The user also logs into the storage service system 70. The reason for this is that the information record is stored in the storage service system 70. The user inputs authentication information (e.g., a user ID and a password) for logging into the storage service system 70. The operation reception unit 12 of the information recording application 41 receives the input of the authentication information.

S5: The communication unit 11 of the information recording application 41 transmits a login request with designation of the authentication information to the information processing system 50.

S6: The communication unit 51 of the information processing system 50 receives the login request and transfers the login request to the storage service system 70 since the login request is for logging into the storage service system 70.

S7: The storage service system 70 authenticates the user on the basis of the authentication information. The following description is given on the assumption that the authentication is successful. The storage service system 70 transmits access token 2 to the information processing system 50.

S8: The communication unit 51 of the information processing system 50 receives the access token 2 and transmits the access token 2 to the information recording application 41. The communication unit 51 attaches the access token 2 to subsequent communication with the storage service system 70, which is not described with reference to FIG. 37. The access token 2 is associated with the permissions assigned to the user who has logged in.

S21: The user operates the teleconferencing application 42 to start a teleconference. The following description is given on the assumption that the teleconferencing application 42 at the site 102 and the teleconferencing application 42 at the other site 101 start a teleconference. The teleconferencing application 42 at the site 102 transmits an image captured by the camera of the terminal apparatus 10 and audio collected by the microphone of the terminal apparatus 10 to the teleconferencing application 42 at the other site 101. The teleconferencing application 42 at the other site 101 displays the received image on the display and outputs the received audio from the speaker. In substantially the same manner, the teleconferencing application 42 at the other site 101 transmits an image captured by the camera of the terminal apparatus 10 and audio collected by the microphone of the terminal apparatus 10 to the teleconferencing application 42 at the site 102. The teleconferencing application 42 at the site 102 displays the received image on the display and outputs the received audio from the speaker. The teleconferencing application 42 at the site 102 and the teleconferencing application 42 at the other site 101 repeat the processing described above to implement the teleconference.

S22: The user sets settings relating to recording on the recording setting screen 210 illustrated in FIG. 30, which is displayed by the information recording application 41. The operation reception unit 12 of the information recording application 41 receives the settings. The following description is given on the assumption that both the camera toggle button 211 and the PC screen toggle button 212 are in the "on" position.

In a case where the user has reserved a teleconference in advance, the user presses the "Obtain information from calendar" button 221 illustrated in FIG. 33 to display a list of teleconferences. The user selects a desired teleconference to be associated with the video record. Since the user has logged into the information processing system 50, the information processing system 50 identifies teleconferences that the logged-in user has a right to view. The information processing system 50 transmits a list of identified teleconferences to the terminal apparatus 10, and the user selects a teleconference being held or to be held. Thus, information related to the teleconference, such as the conference ID, is determined.

In one example, even in a case where the user has not reserved a teleconference in advance, the user creates a conference when creating a video record. In the following description, the information recording application 41 creates a conference when creating a video record and acquires a conference ID from the information processing system 50.

S23: The user instructs the information recording application 41 to start recording. For example, the user presses the "Start recording now" button 216. The operation reception unit 12 of the information recording application 41 receives the instruction. The display control unit 13 displays the recording-in-progress screen 220.

S24: Since no teleconference has been selected (i.e., no conference ID has been determined), the communication unit 11 of the information recording application 41 transmits a teleconference creation request to the information processing system 50.

S25: The communication unit 51 of the information processing system 50 receives the teleconference creation request, and the conference information acquisition unit 54 acquires a unique conference ID assigned by the conference management system 9. Then, the communication unit 51 transmits the conference ID to the information recording application 41.

S26: Further, the conference information acquisition unit 54 transmits a video record storage destination (an URL of the storage service system 70) in which the video record is to be stored to the information recording application 41 via the communication unit 51.

S27: In response to the communication unit 11 of the information recording application 41 receiving the conference ID and the video record storage destination, the moving image storing unit 17 determines that recording is ready to start, and starts recording.

S28: The application screen acquisition unit 14 of the information recording application 41 sends, to an application selected by the user, a request for a screen of the selected application. More specifically, the application screen acquisition unit 14 acquires the screen of the application via the OS. In FIG. 37, in one example, the application selected by the user is the teleconferencing application 42.

S29: The moving image storing unit 17 of the information recording application 41 notifies the meeting device 60 of the start of recording via the device communication unit 16. Desirably, the moving image storing unit 17 also notifies the meeting device 60 of information indicating that the camera toggle button 211 is in the "on" position (a request for the panoramic image and the talker image). The meeting device 60 transmits the panoramic image and the talker image to the information recording application 41 regardless of whether the request is notified.

S30: In response to the terminal communication unit 61 of the meeting device 60 receiving the notification of the start of recording, a unique recorded video ID is assigned. The terminal communication unit 61 transmits the assigned recorded video ID to the information recording application 41. In one example, the recorded video ID is assigned by the information recording application 41. In another example, the recorded video ID is acquired from the information processing system 50.

S31: The audio acquisition unit 15 of the information recording application 41 acquires audio data output from the terminal apparatus 10 (audio data received by the teleconferencing application 42).

S32: The device communication unit 16 transmits the audio data acquired by the audio acquisition unit 15 and an audio combining request to the meeting device 60.

S33: The terminal communication unit 61 of the meeting device 60 receives the audio data and the audio combining request, and the audio combining unit 65 combines the received audio data with audio data of the surroundings collected by the audio collection unit 64. For example, the audio combining unit 65 adds the received audio data and the collected audio data together. Since clear audio around the meeting device 60 is recorded, the accuracy of text conversion from, in particular, the audio around the meeting device 60 (in the conference room) is increased.

The terminal apparatus 10 may perform the combination of the audio data. However, a distributed arrangement of functions and processes such that the recording function is implemented by the terminal apparatus 10 and the audio processing is performed by the meeting device 60 reduces the load on each of the terminal apparatus 10 and the meeting device 60. In another distributed arrangement of functions and processes, the recording function may be implemented by the meeting device 60, and the audio processing may be performed by the terminal apparatus 10.

S34: The panoramic image creation unit 62 of the meeting device 60 creates a panoramic image, and the talker image creation unit 63 creates a talker image.

S35: The device communication unit 16 of the information recording application 41 repeatedly acquires the panoramic image and the talker image from the meeting device 60. Further, the device communication unit 16 repeatedly sends a request for the combined audio data to the meeting device 60 and acquires the combined audio data. In one example, the device communication unit 16 may acquire the panoramic image and the talker image by sending a request to the meeting device 60. In another example, in response to receiving information indicating that the camera toggle button 211 is in the "on" position, the meeting device 60 may automatically transmit the panoramic image and the talker image. In response to receiving the audio combining request, the meeting device 60 may automatically transmit the combined audio data to the information recording application 41.

S36: The display control unit 13 of the information recording application 41 displays the application screen, the panoramic image, and the talker image side by side on the recording-in-progress screen 220. The moving image storing unit 17 of the information recording application 41 stores the application screen, the panoramic image, and the talker image acquired from the teleconferencing application 42 as separate video records. In other words, the moving image storing unit 17 creates the respective video records by designating the application screen, the panoramic image, and the talker image, which are repeatedly received, as frames of a moving image. Further, the moving image storing unit 17 stores the audio data received from the meeting device 60.

The information recording application 41 repeats the processing of steps S31 to S36 described above.

S37: When the teleconference ends and the recording is no longer performed, the user instructs the information recording application 41 to finish the recording. For example, the user presses the "End recording" button 227. The operation reception unit 12 of the information recording application 41 receives the instruction.

S38: The device communication unit 16 of the information recording application 41 notifies the meeting device 60 of the end of recording. The meeting device 60 continues creating the panoramic image and the talker image and combining the audio. The meeting device 60 may change the processing load by, for example, changing the resolution or the frame rate (in frames per second) depending on whether recording is in progress.

S39: The moving image storing unit 17 of the information recording application 41 combines the audio data with the video record to generate a combined moving image with accompanying audio. If no video record is to be stored, the audio data may be independent. Of three video records, namely, an application screen, a panoramic image, and a talker image, a video record with which the audio data is to be combined is determined in advance according to the priority order. In some embodiments, the video record and the audio data are not combined.

S40: In a case where the user checks the check box 215 with the message "Automatically transcribe audio recordings after uploading the recordings" on the recording setting screen 210, the audio data processing unit 18 requests the information processing system 50 to convert the audio data into text data.

Specifically, the audio data processing unit 18 transmits an audio data conversion request for converting the audio data combined with the video record, with designation of the URL of the storage destination, together with the conference ID and the recorded video ID, to the information processing system 50 via the communication unit 11.

S41: The communication unit 51 of the information processing system 50 receives the audio data conversion request, and the text conversion unit 55 converts the audio data into text data using the speech recognition service system 80. The communication unit 51 stores the text data in the same storage destination (the URL of the storage service system 70) as the video record storage destination. The text data is associated with the video record by the conference ID and the recorded video ID in the recorded video information storage unit 5002. In one example, the text data may be managed by the conference information acquisition unit 54 of the information processing system 50 and stored in the storage unit 5000. In another example, the terminal apparatus 10 may request the speech recognition service system 80 to perform speech recognition, and may store text data acquired from the speech recognition service system 80 in the storage destination.

In the illustrated example, the speech recognition service system 80 returns the converted text data to the information processing system 50. In another example, the speech recognition service system 80 directly transmits the text data to the URL of the storage destination. The speech recognition service system 80 may be selected or switched among multiple services according to the setting information set by the user in the information processing system 50.

S42: The upload unit 20 of the information recording application 41 stores the video record in the video record storage destination via the communication unit 11. In the recorded video information storage unit 5002, the video record is associated with the conference ID and the recorded video ID. The uploaded status is recorded for the video record.

The user is notified of the storage destination, thus allowing the user to share the video record with the other participants by sending the storage destination via e-mail or the like. Even the video record, the audio data, and the text data that are created by different devices or apparatuses are collectively stored in one storage location and easily accessible to the user later.

In the case of real-time speech recognition, the meeting device 60 or the terminal apparatus 10 transmits audio data to the information processing system 50 in real time. The terminal apparatus 10 displays the text data transmitted from the meeting device 60 or returned from the information processing system 50 on the recording-in-progress screen 220 and stores the text data.

The processing of steps S31 to S36 may be performed in an order different from that illustrated in FIG. 37. For example, the combining of the audio data and the storing of the video record may be performed in the reverse order.

The meeting device 60 according to the present embodiment includes the upper hood 632. This configuration allows a reduction in the influence of direct light from a ceiling light in an office on the seams of the panoramic image. Software-based image processing is performed, and the processing load for reducing flare and ghosting is reduced. This allows the terminal apparatus 10 to display a visually comfortable panoramic image even as a moving image in real time. Structural measures are taken for the meeting device 60 to achieve the software-based reduction in processing load, and even a device that provides real-time characteristics, such as a web camera, makes the seams smooth.

Further, the incident angle θ is adjusted to be greater than or equal to 30 degrees to secure an angle of view for capturing an image of a person, and, additionally, the incident angle θ is limited to be less than or equal to 67 degrees. This allows a reduction in the influence of direct light from the ceiling light in the office on the seams of the panoramic image and allows capturing of an image of a person.

Furthermore, the influence of direct light from the ceiling light in the office is reduced near the lens ends serving as the seams compared with that in the lens front direction, thus allowing the adverse influences on the seams of the panoramic image to be more intensively reduced.

While some embodiments of the present disclosure have been described with reference to examples, the embodiments do not limit the present disclosure in any way. Various modifications and replacements may be made to the embodiments without departing from the spirit and scope of the present disclosure.

For example, the terminal apparatus 10 and the meeting device 60 may be integrated together. The meeting device 60 may be externally attached to the terminal apparatus 10. The meeting device 60 may be implemented by a spherical camera, a microphone, and a speaker connected to one another by cables.

In one example, the meeting device 60 distributes video to the terminal apparatus 10 in the same site. The meeting device 60 broadcasts video to, for example, the terminal apparatus 10 connected to the same service set identifier (SSID).

The meeting device 60 may also be placed at the other site 101. The meeting device 60 at the other site 101 separately creates a combined moving image and text data. A plurality of meeting devices 60 may be placed at one site. In a case where a plurality of meeting devices 60 are placed at one site, a plurality of information records are created for each meeting device 60.

The arrangement of the panoramic image 203, the talker images 204, and the screen of the application in the video record according to the present embodiment is merely an example. The panoramic image 203 and the talker images 204 may be displayed vertically such that the panoramic image 203 is located below the talker images 204. The user may change the arrangement of the panoramic image 203 and the talker images 204 or individually turn on and off the display of the panoramic image 203 and the talker images 204 when displaying the video record.

The example functional configurations illustrated in, for example, FIG. 7 are divided according to main functions to facilitate understanding of processes performed by the terminal apparatus 10, the meeting device 60, and the information processing system 50. The scope of the present disclosure is not limited by the manner in which each apparatus or device is divided into processing units or by the names of the processing units. The processes performed by the terminal apparatus 10, the meeting device 60, and the information processing system 50 may be divided into more processing units in accordance with the content of the processes. Further, the division may be made such that each processing unit includes more processing operations. For example, a system for creating a video record may be separate from a system for displaying the video record.

The apparatuses or devices described in one or more embodiments are just one example of plural computing environments that implement the one or more embodiments disclosed herein. In some embodiments, the information processing system 50 includes multiple computing devices such as a server cluster. The multiple computing devices are configured to communicate with one another through any type of communication link including, for example, a network and a shared memory, and perform the processes disclosed herein.

Further, the information processing system 50 may be configured to share the processing steps disclosed herein, for example, the processing steps illustrated in FIG. 37, in various combinations. For example, a process executed by a predetermined unit may be executed by multiple information processing apparatuses included in the information processing system 50. The components of the information processing system 50 may be integrated into one server apparatus or divided into a plurality of apparatuses.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

Any one of the above-described operations may be performed in various other ways, for example, in an order different from the one described above.

Aspect 1

In Aspect 1, an image capturing device for capturing an image at an angle of view of 360 degrees at least in a horizontal direction includes a plurality of lenses and an upper hood. The plurality of lenses have an optical axis in the horizontal direction. The upper hood shields incidence of light on the plurality of lenses from directly above. The upper hood limits an incident angle of light to an angle greater than or equal to 30 degrees and less than or equal to 67 degrees. The incident angle is defined by a direction in which light from above is incident on each of the plurality of lenses at a maximum angle and the optical axis of the plurality of lenses.

Aspect 2

According to Aspect 2, in the image capturing device of Aspect 1, the upper hood has a shape, as viewed from above, such that the incident angle in a lens end direction is smaller than the incident angle in an optical axis direction.

Aspect 3

According to Aspect 3, in the image capturing device of Aspect 2, the upper hood limits the incident angle in the lens end direction to an angle greater than or equal to 30 degrees and less than or equal to 45 degrees.

Aspect 4

According to Aspect 4, in the image capturing device of Aspect 2, a ratio of the incident angle in the lens end direction to the incident angle in the optical axis direction is less than or equal to 2.

Aspect 5

According to Aspect 5, in the image capturing device of any one of Aspect 1 to Aspect 4, the upper hood has a side surface with an inward-curving shape from an upper hood protrusion along an outer edge of the upper hood to the plurality of lenses.

Aspect 6

According to Aspect 6, in the image capturing device of any one of Aspect 1 to Aspect 4, the upper hood has a side surface with a stepped shape from an upper hood protrusion along an outer edge of the upper hood to the plurality of lenses.

Aspect 7

According to Aspect 7, in the image capturing device of any one of Aspect 1 to Aspect 6, the upper hood has a circular, elliptical, rectangular, or octagonal shape as viewed from above.

Aspect 8

In Aspect 8, a program causes a terminal apparatus connected to the image capturing device of any one of Aspect 1 to Aspect 7 to function as a display control unit and a moving image storing unit. The display control unit displays an image captured by the image capturing device. The moving image storing unit stores the image.

The invention claimed is:

1. An image capturing device for capturing an image at an angle of view of 360 degrees in a horizontal direction, the image capturing device comprising:

a plurality of lenses having an optical axis in the horizontal direction; and an upper hood to shield incidence of light on the plurality of lenses from above, wherein the upper hood limits an incident angle of light to an angle greater than or equal to 30 degrees and less than or equal to 67 degrees, the incident angle being defined by a direction in which light from above is incident on each of the plurality of lenses at a maximum angle and the optical axis of the plurality of lenses, the upper hood has a shape, as viewed from above, such that the incident angle in a lens end direction is smaller than the incident angle in an optical axis direction, and a ratio of the incident angle in the lens end direction to the incident angle in the optical axis direction is less than or equal to 2.

2. The image capturing device according to claim 1, wherein the upper hood limits the incident angle in the lens end direction to an angle greater than or equal to 30 degrees and less than or equal to 45 degrees.

3. The image capturing device according to claim 1, wherein the upper hood includes an upper hood protrusion along an outer edge of the upper hood, and the upper hood has a side surface with an inward-curving shape from the upper hood protrusion to the plurality of lenses.

4. The image capturing device according to claim 1, wherein the upper hood includes an upper hood protrusion along an outer edge of the upper hood, and the upper hood has a side surface with a stepped shape from the upper hood protrusion to the plurality of lenses.

5. The image capturing device according to claim 1, wherein the upper hood has a circular, elliptical, rectangular, or octagonal shape as viewed from above.

6. A panoramic image creation method executed by an image capturing device for capturing an image at an angle of view of 360 degrees in a horizontal direction, the image capturing device including a plurality of lenses having an optical axis in the horizontal direction, and an upper hood to shield incidence of light on the plurality of lenses from directly above, the upper hood limiting an incident angle of light to an angle greater than or equal to 30 degrees and less than or equal to 67 degrees, the incident angle being defined by a direction in which light from above is incident on each of the plurality of lenses at a maximum angle and the optical axis of the plurality of lenses, the panoramic image creation method comprising:

generating an image that covers an angle greater than 180 degrees in the horizontal direction using a plurality of imaging elements each corresponding to one of the plurality of lenses, the plurality of imaging elements including a first imaging element and a second imaging element;

performing pattern matching on an edge portion of a first image generated by the second imaging element using an edge portion of a second image generated by the first imaging element to identify stitching portions of the first image and the second image having a highest similarity; and stitching the first image and the second image in the stitching portions to create a panoramic image that covers 360 degrees in the horizontal direction, wherein the upper hood has a shape, as viewed from above, such that the incident angle in a lens end direction is smaller than the incident angle in an optical axis direction, and a ratio of the incident angle in the lens end direction to the incident angle in the optical axis direction is less than or equal to 2.

7. An image capturing device for capturing an image at an angle of view of 360 degrees in a horizontal direction, the image capturing device comprising:

a plurality of lenses having an optical axis in the horizontal direction; and an upper hood to shield incidence of light on the plurality of lenses from above, wherein the upper hood limits an incident angle of light to an angle greater than or equal to 30 degrees and less than or equal to 67 degrees, the incident angle being defined by a direction in which light from above is incident on each of the plurality of lenses at a maximum angle and the optical axis of the plurality of lenses, the upper hood includes an upper hood protrusion along an outer edge of the upper hood, and the upper hood has a side surface with a stepped shape from the upper hood protrusion to the plurality of lenses.

8. A meeting device used for conducting a remote conference, the meeting device comprising:

an imaging device having an optical axis directed in opposite directions with respect to a horizontal direction, the imaging device having at least two lenses, each lens of the at least two lenses having an angle of view of 180 degrees or more and capable of imaging at an angle of view of 360 degrees in the horizontal direction;

a protrusion portion disposed above the at least two lenses and projecting outward from a position of upper surfaces of the at least two lenses; and a body portion disposed under the imaging device and having a microphone and a speaker, wherein the protrusion portion has a circular shape when viewed from above, and the imaging device has at least two recesses in a circumferential direction of the protrusion portion in the horizontal direction, and the at least two lenses are disposed in corresponding recesses of the at least two recesses, respectively, and wherein the protrusion portion has a shape, as viewed from above, such that an incident angle of light in a lens end direction is smaller than the incident angle in an optical axis direction, and a ratio of the incident angle in the lens end direction to the incident angle in the optical axis direction is less than or equal to 2.

9. The meeting device according to claim 8, wherein when viewed from above, a radial size of the imaging device is smaller than a radial size of the body portion.

10. The meeting device according to claim 8, wherein the protrusion portion has a side surface with an inward-curving shape.

11. The meeting device according to claim 10, wherein the protrusion portion limits the incident angle of light to an angle greater than or equal to 30 degrees and less than or equal to 67 degrees.

12. The meeting device according to claim 8, wherein the protrusion portion limits the incident angle of light to an angle greater than or equal to 30 degrees and less than or equal to 67 degrees.

* * * * *